(12) United States Patent  
Nolte

(10) Patent No.: US 12,484,471 B2  
(45) Date of Patent: Dec. 2, 2025

(54) INTEGRATED AIR ENTRAINER SEGMENT AIR SOURCE

(71) Applicant: Kinze Manufacturing, Inc., Williamsburg, IA (US)

(72) Inventor: Steve Nolte, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 277 days.

(21) Appl. No.: 17/651,666

(22) Filed: Feb. 18, 2022

(65) Prior Publication Data

US 2022/0264787 A1    Aug. 25, 2022

Related U.S. Application Data

(60) Provisional application No. 63/200,177, filed on Feb. 19, 2021.

(51) Int. Cl.
*A01C 7/08* (2006.01)
*A01C 7/20* (2006.01)

(52) U.S. Cl.
CPC .............. *A01C 7/082* (2013.01); *A01C 7/084* (2013.01); *A01C 7/205* (2013.01)

(58) Field of Classification Search
None
See application file for complete search history.

(56) References Cited

U.S. PATENT DOCUMENTS

| 3,999,690 A | 12/1976 | Deckler |
| 4,771,912 A | 9/1988 | van Wingerden |
| 4,852,809 A | 8/1989 | Davis et al. |
| 5,379,706 A | 1/1995 | Gage et al. |
| 6,047,652 A | 4/2000 | Prairie et al. |
| 6,176,393 B1 | 1/2001 | Luxon |

(Continued)

FOREIGN PATENT DOCUMENTS

| DE | 202012101029 | 8/2013 |
| EP | 2696667 | 10/2012 |

(Continued)

OTHER PUBLICATIONS

International Searching Authority, "The International Search Report and the Written Opinion of the International Searching Authority, or the Declaration", issued in connection to PCT/US2019/061225 filed Nov. 13, 2019, 15 pages, mailed Mar. 9, 2020.

(Continued)

*Primary Examiner* — Joseph A Dillon, Jr.
(74) *Attorney, Agent, or Firm* — McKee, Voorhees & Sease, PLC

(57) ABSTRACT

The pressure of a fluid passing through several air entrainers can be controlled so as to more effectively move particulate material from one or more bulk hoppers to an end location. This is accomplished through use of an integrated, electric fluid pressure source, such as a fan in one or more of the segments. The pressure can be increased based upon a speed of an agricultural implement or a weight of the particulate material and/or the pneumatic flow can compensate for distance the seed must travel before planting. The entrainer can thus be installed with a high speed planting implement, thereby reducing downtime and facilitating repair.

10 Claims, 17 Drawing Sheets

(56) References Cited

U.S. PATENT DOCUMENTS

| | | | |
|---|---|---|---|
| 6,494,154 B2 | 12/2002 | Kinzenbaw et al. | |
| 6,845,724 B2 | 1/2005 | Mayerle et al. | |
| 7,021,224 B2 | 4/2006 | Mayerle et al. | |
| 7,025,010 B2 | 4/2006 | Martin et al. | |
| 7,182,029 B2 | 2/2007 | Johnson et al. | |
| 7,213,525 B2 | 5/2007 | Meyer et al. | |
| 7,938,072 B2 | 5/2011 | Wilhelmi et al. | |
| 8,234,987 B2 | 8/2012 | Georgison et al. | |
| 8,276,530 B2 | 10/2012 | Anderson et al. | |
| 8,448,585 B2 | 5/2013 | Wilhelmi et al. | |
| 8,800,458 B1 | 8/2014 | Wilhelmi et al. | |
| 9,215,840 B2 | 12/2015 | Johnson et al. | |
| 9,215,841 B2 | 12/2015 | Johnson et al. | |
| 9,237,687 B2 | 1/2016 | Sauder et al. | |
| 9,253,940 B2 | 2/2016 | Wilhelmi et al. | |
| 9,265,190 B2 | 2/2016 | Johnson et al. | |
| 9,622,402 B2 | 4/2017 | Kinzenbaw | |
| 9,629,305 B2 | 4/2017 | Kinzenbaw et al. | |
| 9,750,177 B2 | 9/2017 | Johnson et al. | |
| 9,750,178 B2 | 9/2017 | Kinzenbaw et al. | |
| 9,756,779 B2 * | 9/2017 | Wilhelmi | A01C 7/206 |
| 9,763,380 B2 | 9/2017 | Hahn et al. | |
| 9,848,525 B2 | 12/2017 | Johnson et al. | |
| 9,854,731 B2 | 1/2018 | Henry et al. | |
| 9,901,026 B2 | 2/2018 | Kinzenbaw et al. | |
| 9,922,402 B2 | 3/2018 | Hirai | |
| 9,924,627 B1 | 3/2018 | Beaujot et al. | |
| 9,980,425 B2 | 5/2018 | Wilhelmi et al. | |
| 10,051,779 B2 | 8/2018 | Chahley et al. | |
| 10,070,576 B2 | 9/2018 | Swanson | |
| 10,206,327 B2 | 2/2019 | Hahn et al. | |
| 10,225,977 B2 | 3/2019 | Kinzenbaw et al. | |
| 10,244,674 B2 | 4/2019 | Kinzenbaw et al. | |
| 10,257,975 B2 | 4/2019 | Kinzenbaw et al. | |
| 10,299,426 B2 | 5/2019 | Johnson et al. | |
| 10,667,462 B2 | 6/2020 | Kinzenbaw et al. | |
| 10,709,056 B2 | 7/2020 | Johnson et al. | |
| 10,709,057 B2 | 7/2020 | Johnson et al. | |
| 10,757,855 B2 | 9/2020 | Johnson et al. | |
| 10,779,460 B2 | 9/2020 | Pirkenseer | |
| 10,842,072 B2 | 11/2020 | Wilhelmi et al. | |
| 2004/0149186 A1 | 8/2004 | Stark et al. | |
| 2004/0159669 A1 | 8/2004 | Pollard et al. | |
| 2004/0206283 A1 | 10/2004 | Mayerle | |
| 2008/0295751 A1 | 12/2008 | Shoup et al. | |
| 2011/0162566 A1 | 7/2011 | Wilhelmi | |
| 2012/0103238 A1 * | 5/2012 | Beaujot | A01C 7/102 220/211 |
| 2012/0111248 A1 | 5/2012 | Dillman | |
| 2012/0174840 A1 | 7/2012 | Friggstad | |
| 2013/0276684 A1 | 10/2013 | Wilhelmi et al. | |
| 2014/0193211 A1 | 7/2014 | Connors et al. | |
| 2016/0106027 A1 | 4/2016 | Wilhelmi et al. | |
| 2016/0120104 A1 | 5/2016 | Chahley et al. | |
| 2016/0157418 A1 * | 6/2016 | Henry | A01C 7/084 701/50 |
| 2016/0165791 A1 | 6/2016 | Roszman et al. | |
| 2017/0142896 A1 | 5/2017 | Roberge et al. | |
| 2017/0318737 A1 | 11/2017 | Gilstring | |
| 2018/0271007 A1 | 9/2018 | Wilhelmi et al. | |
| 2019/0098828 A1 | 4/2019 | Wilhelmi et al. | |
| 2020/0053955 A1 | 2/2020 | Borkgren et al. | |
| 2020/0068789 A1 | 3/2020 | Rieder et al. | |
| 2020/0107496 A1 | 4/2020 | Gray et al. | |
| 2020/0170179 A1 | 6/2020 | Jagow et al. | |
| 2021/0015030 A1 * | 1/2021 | Ruppert | A01C 15/04 |
| 2021/0190567 A1 | 6/2021 | Nedved et al. | |
| 2021/0298286 A1 * | 9/2021 | Ruppert | A01M 7/005 |
| 2021/0300692 A1 * | 9/2021 | Harmon | A01C 7/081 |
| 2023/0200291 A1 * | 6/2023 | Thompson | A01C 7/06 111/174 |

FOREIGN PATENT DOCUMENTS

| | | |
|---|---|---|
| EP | 2591656 A1 | 5/2013 |
| GB | 575348 A | 2/1946 |
| RU | 2228586 C2 | 7/2003 |
| WO | 0183161 | 11/2001 |
| WO | 2010064676 A1 | 6/2010 |
| WO | 2010129762 | 11/2010 |
| WO | 2011003078 A1 | 1/2011 |
| WO | 2013130007 A1 | 9/2013 |

OTHER PUBLICATIONS

International Bureau, "Notification Concerning Transmittal of International Preliminary Report on Patentability (Chapter 1 of the Patent Cooperation Treaty)", issued in connection to PCT/US2019/061225 filed Nov. 13, 2019, 8 pages, mailed May 27, 2021.

International Searching Authority, "Notification of Transmittal of the International Search Report and the Written Opinion of the International Searching Authority, or the Declaration", Issued in connection to PCT/US2015/024489, filed Apr. 6, 2015, 13 pages, mailed Jun. 29, 2015.

RU 2 228 586 C2—English Abstract May 20, 2004.

International Search Report and Written Opinion in PCT/US2022/017052, mailed May 20, 2022, 13 pages.

* cited by examiner

INTEGRATED AIR ENTRAINER SEGMENT AIR SOURCE

CROSS REFERENCE TO RELATED APPLICATIONS

This application claims priority under 35 U.S.C. § 119 to provisional patent application U.S. Ser. No. 63/200,177, filed Feb. 19, 2022. The provisional patent application is herein incorporated by reference in its entirety, including without limitation, the specification, claims, and abstract, as well as any figures, tables, appendices, or drawings thereof.

FIELD OF THE INVENTION

The invention relates generally to the field of agricultural equipment. More particularly, but not exclusively, the invention relates to systems, methods, and/or apparatus for moving particulate material, e.g., seed, from one location to another on, in, and/or around an agricultural implement.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

Large scale agricultural planters typically include a plurality of individual hoppers and seed metering units. During planting, the hopper holds the mass of seed that the planter distributes onto the ground. The metering units are responsible for delivering the seed to the ground. As the planter moves over the planting surface, it is important that the metering units distribute the seed uniformly and at precise intervals to achieve proper spacing of crops. To achieve such a distribution, it is important that the supply of seed to the seed meters is steady and uninterrupted.

U.S. Pat. Nos. 8,448,585 and 9,253,940, both to Wilhelmi et al., disclose an air entrainment device for seed delivery that utilizes an air permeable surface and are herein incorporated by reference in their entirety.

While effective for its purpose of delivering seed, there still exists some room to make the air entrainment device more efficient. For example, in most agricultural implements, a single fan or blower is used to provide pneumatic pressure for delivering particulate material (e.g., seed) to each of the row units along the length of the toolbar. As the entrainment system is located at a generally central location at or near the bulk hoppers, the seeds may need to travel varying lengths to get to the spread out row units.

Therefore, there exists a need in the art to optimize and improve the efficiency of an air entrainment system used to deliver particulate material, such as seed, from one or more bulk hoppers to individual row units of an agricultural implement.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to control airflow used to move particulate material from one or more bulk hoppers to individual row units.

It is still yet a further object, feature, and/or advantage to optimize the pneumatic flow used to move particulate material from one or more bulk hoppers to individual row units.

It is still a further object, feature, and/or advantage to provide an integrated pneumatic pressure source with each segment or a small subset of segments of an air entrainment system.

It is another object, feature, and/or advantage to compensate the airflow needed for distance traveled of the particulate material and/or the product rate of material to one or more row units on an on-demand manner.

It is a further object, feature, and/or advantage to provide a system, method, and/or apparatus to be used with a high speed planting implement.

It is still yet a further object, feature, and/or advantage to practice methods which facilitate use, manufacture, assembly, maintenance, and repair of an air entrainment system accomplishing some or all of the previously stated objectives.

The air entrainment system disclosed herein can be used in a wide variety of applications. For example, the system, as well as components thereof, could be used to move seed from one or more bulk hoppers to individual row units or a small subset of row units of an agricultural planter.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an air entrainment system, which accomplish some or all of the previously stated objectives.

For example, having a pressure source used with one or less than all of the segments of an air entrainment system reduces the downtown of the system and makes it easier to replace pressure source at a local level.

The air entrainment system, as well as any of the components shown and/or described herein, can be incorporated into systems that accomplish some or all of the previously stated objectives. This includes retrofitting existing agricultural implements, such as planter or seeders, and also new implements that move particulate material.

According to some aspects of the present disclosure, a seed delivery assembly comprises a plurality of entrainers operatively connected to one another, each of said entrainers comprising at least one seed entrance; at least one primary fluid path in communication with a fluid source, wherein fluid and seed are combined at said at least one primary fluid path; at least one bypass path for receiving and directing an amount of the fluid; and at least one outlet; and an integrated, electric fluid pressure source positioned to provide pressure (push or pull, depending on configuration) to the fluid and aid in moving the seed towards an end location.

According to some additional aspects of the present disclosure, the end location is a row unit of an agricultural implement.

According to some additional aspects of the present disclosure, the integrated, electric fluid pressure source is operatively connected to a flow control for individually adjusting the pressure at each one of the plurality of entrainers. The flow control can be a valve, an insert, or a baffle, which can be positioned downstream at the row unit.

According to some additional aspects of the present disclosure, the number of entrainers can be more than three, and those entrainers may be preferably divided up into subsets of either two or three.

According to some additional aspects of the present disclosure, the entrainers can be attached to hoppers by way of upper mounting brackets and a pivot can allow pivotal movement between the plurality of entrainers and the bulk seed storage members.

According to some other aspects of the present disclosure, a method of delivering seed comprising providing fluid with a fluid source; allowing fluid to pass through a fluid path defined through segments of an entrainment assembly; increasing pressure of the fluid with a plurality of electric fans; and controlling pneumatic flow within the fluid path to move particulate material from one or more bulk hoppers to an end location. The method can also include controlling the pneumatic flow for each segment with the integrated, electric fluid pressure source because it is integrated within one or more of the segments of the entrainment assembly; increasing pressure of the fluid based upon a speed of an agricultural implement or a weight of the particulate material; compensating the pneumatic flow needed for distance traveled of the particulate material and/or the product rate of material to one or more row units on an on-demand manner; installing the entrainer on a high speed planting implement and designating each electric fan for use with one or less than all of the segments of the entrainer to reduce downtime and facilitate repair.

According to some other aspects of the present disclosure, an agricultural implement can comprise an entrainment assembly having segments; an air source for providing air to the segments; a plurality of row units; and an integrated, electric fluid pressure source configured to provide a pressure differential in the air at a subset of one or more but not all of the segments to aid in moving the seed towards the plurality of row units. A second integrated, electric fluid pressure source substantially identical to the integrated, electric fluid pressure source for provide a pressure differential in the air at a second subset of the segments. Alternatively, the agricultural implement can comprise a plurality of air entrainers; a plurality of row units operatively attached to a toolbar, each of said row units including at least one seed meter housing for substantially enclosing at least one seed meter configured to singulate and dispense seed; and a plurality of integrated, electric fluid pressure sources configured to provide a pressure differential at each of the plurality of row units, said pressure differential used to urge seed to temporarily adhere to a seed disc positioned within the at least one seed meter housing. Central hoppers can be used to store the seed prior to dispensement.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Figure 1:
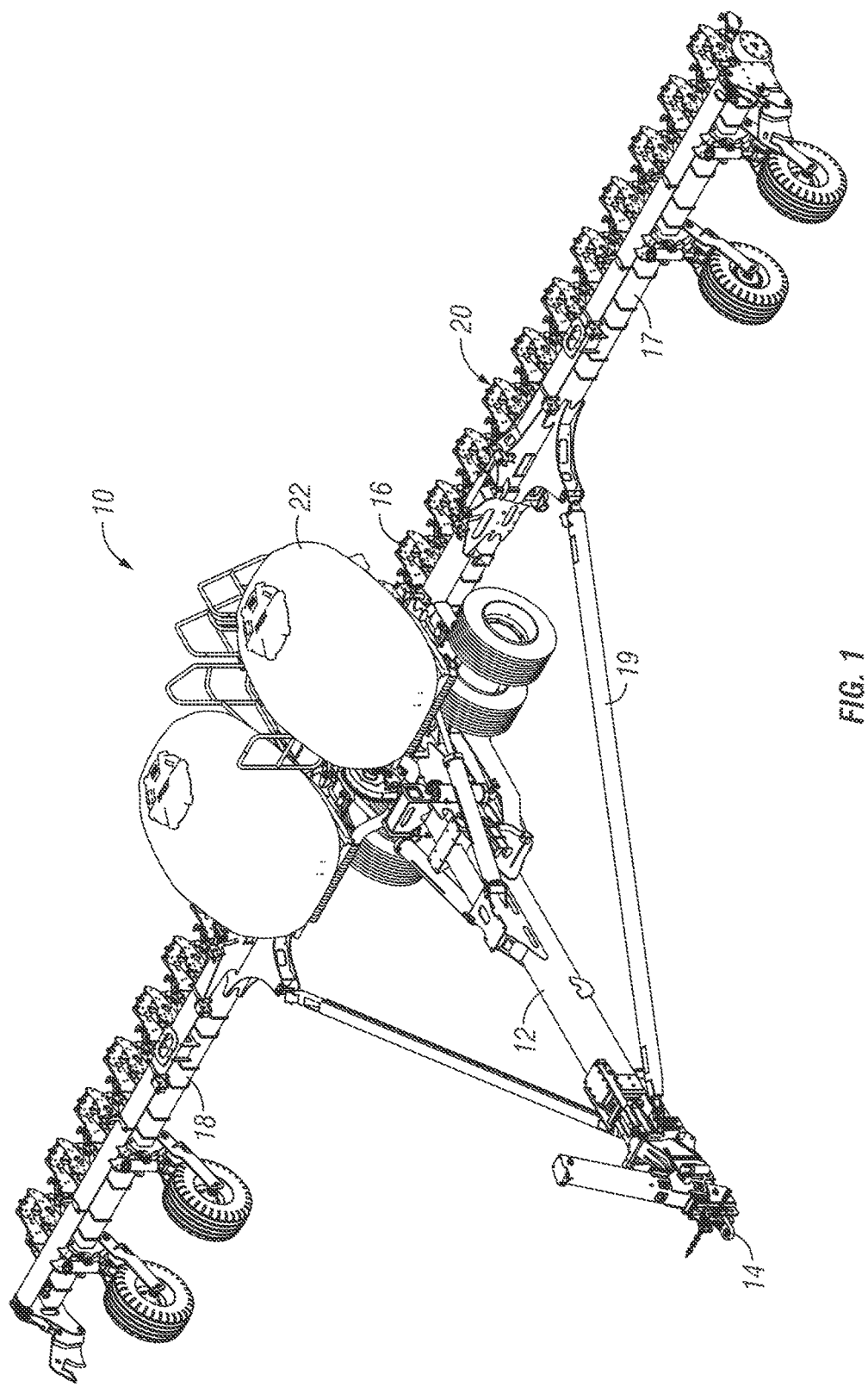
FIG. 1 is a perspective view of a planting implement including the air entrainment assembly.
Figure 2:
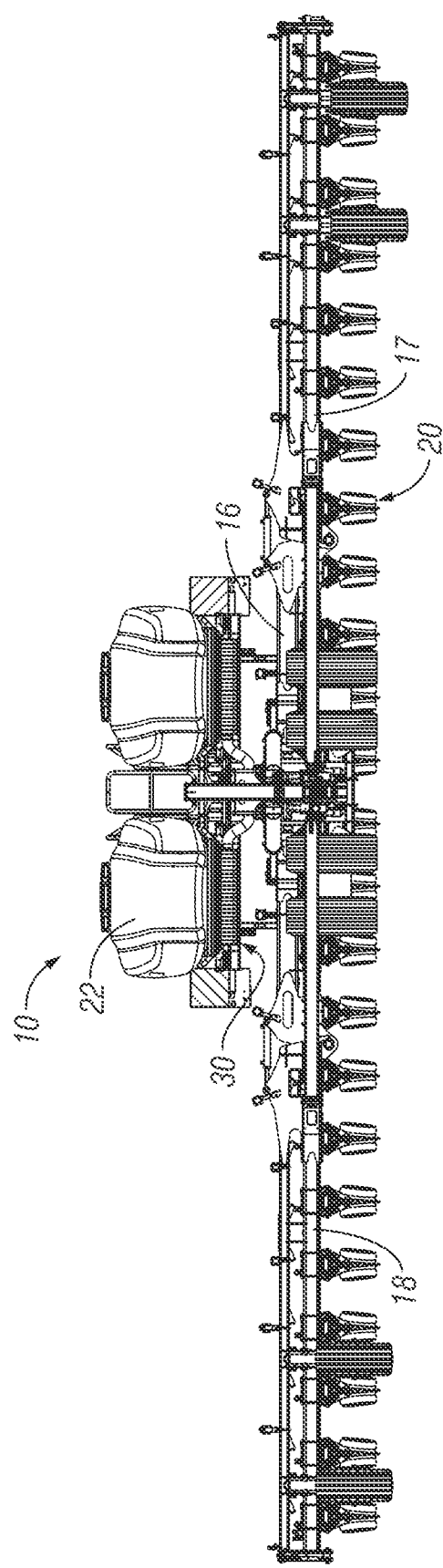
FIG. 2 is a front elevation view of the planting implement.
Figure 3:
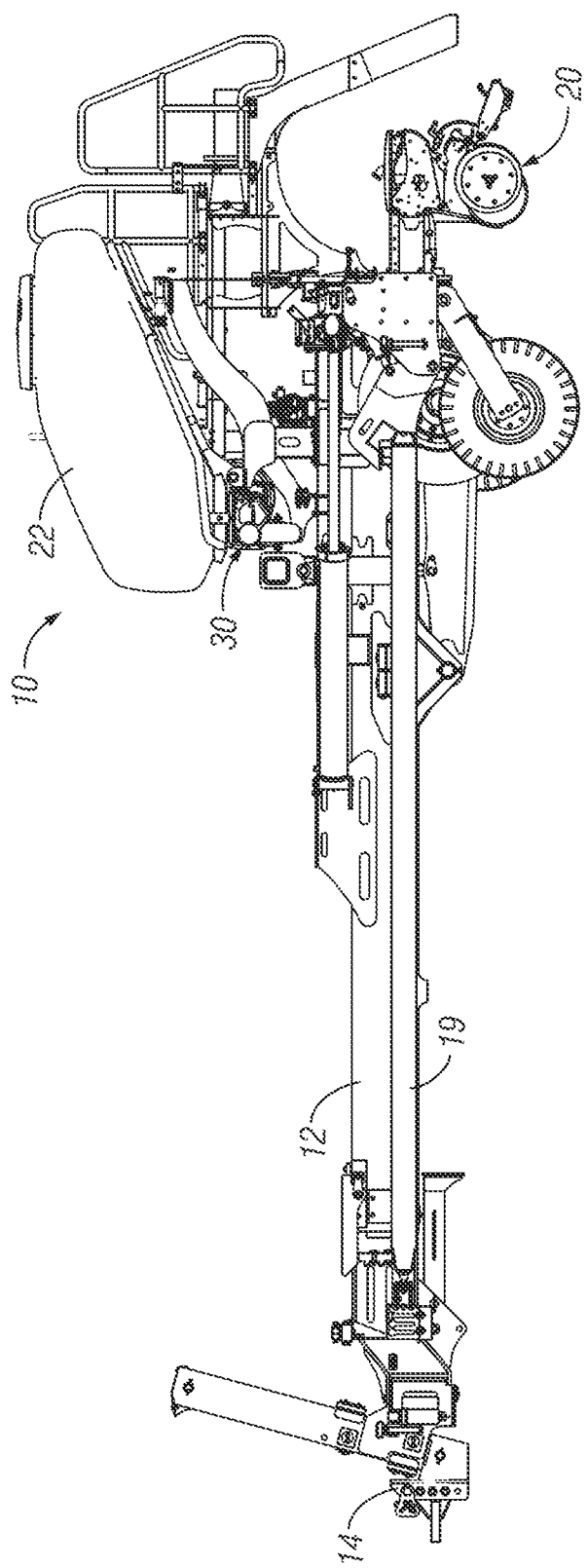
FIG. 3 is a side elevation view of the planting implement.

FIGS. 1-3 disclose use of an exemplary agricultural implement 10. The agricultural implement 10 as shown in the figures is a planting implement 10. The implement 10 may be generally any implement for engaging with the ground or otherwise distributing a material, such as a particulate material to the ground. As will be understood, the invention relates to ways to distribute material, such as a particulate material to various ground engaging apparatus to evenly distribute said particulate material into accurately, efficiently, and in some embodiments at high speed distribute said particulate material to or in said ground. Furthermore, as will be understood, while the planting implement 10 as shown in the figures is provided, additional types of implements including additional planting implements with various features as is known can utilize the invention and/or aspects thereof to be able to distribute and apply the particulate material, such as seed, to the ground.

Therefore, the planting implement 10 as shown in the figures includes a tongue 12 with a hitch 14 at a first end and a tool bar extending generally transversely to the tongue 12 at a second end. The tool bar 16 extends to connect to a plurality of row units 20 which include ground engagement apparatus. As will be discussed in more detail with reference to FIGS. 11-16, the row units 20 may also include additional aspects such as metering elements, singulation elements, ground opening, closing elements, metering system, and the like. However, it is to be appreciated that generally other types of row units, ground engaging elements, and/or metering elements can utilize any of the aspects of the invention disclosed herein. For example, the row units 20 could include fertilizer or other particulate material application apparatus, and the entrainment system disclosed be used to distribute the particulate material to the row units 20.

Extending outwardly from the toolbar 16 and also generally transverse to the tongue 12 are wing elements 17 and 18. The wing elements 17, 18 provide additional width of the toolbar such that additional row units 20 can be attached along thereto. This will allow for a greater number of row units 20 to be attached to the toolbar to be used for distributing for a particulate material. Additional elements show in the figures include draft links 19, which generally connect the wings 17, 18 to the tongue 12. One or more actuators can be connected to the system to provide for the wings 17, 18 to be folded in a generally forward manner wherein they will be somewhat parallel to the tongue 12 to move the planting implement 10 from a field use configuration to a row use configuration. However, additional planting units may include that the toolbar is lift and rotated, is folded rearwardly, does not fold at all, or include some sort of combination thereof.

Figure 4:
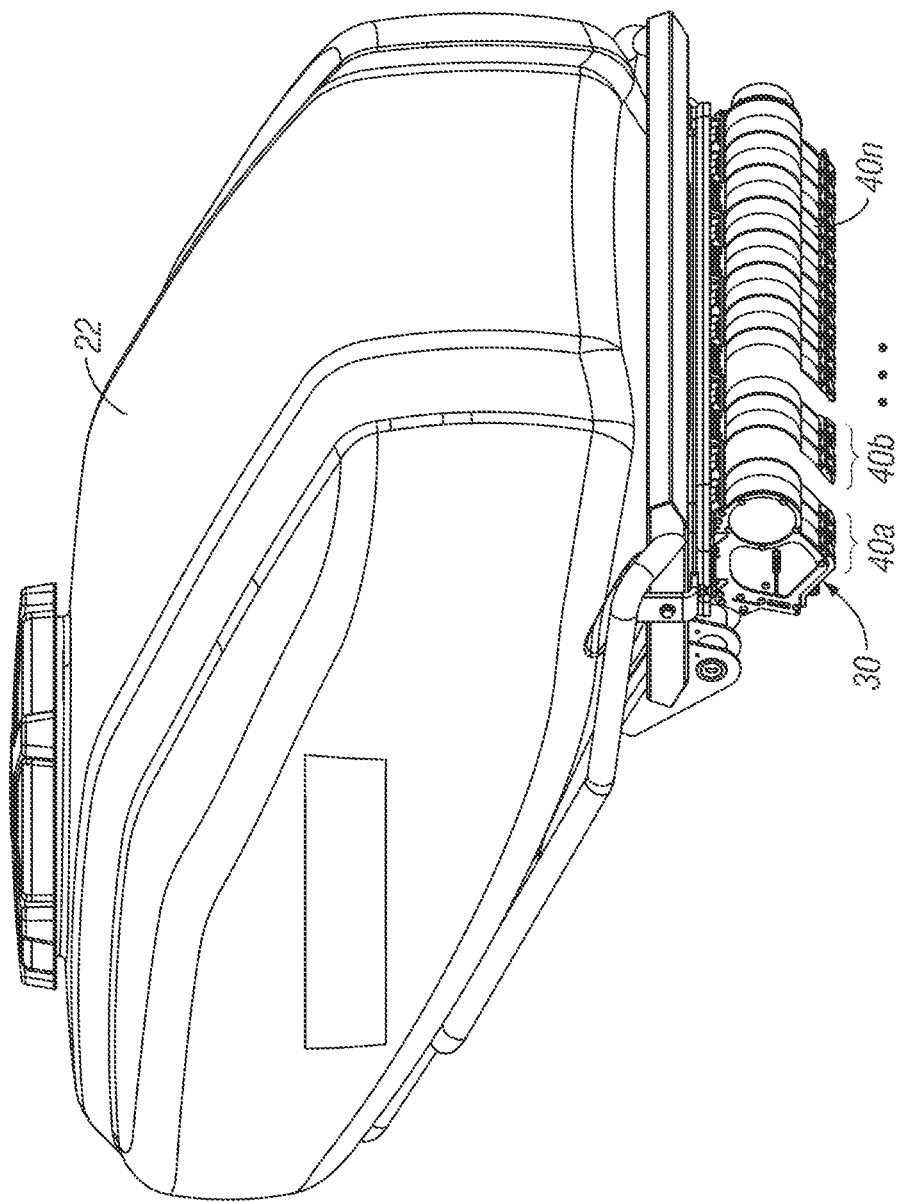
FIG. 4 is a perspective view of an air seed delivery system including an exemplary hopper and an air entrainment assembly.
Figure 5:
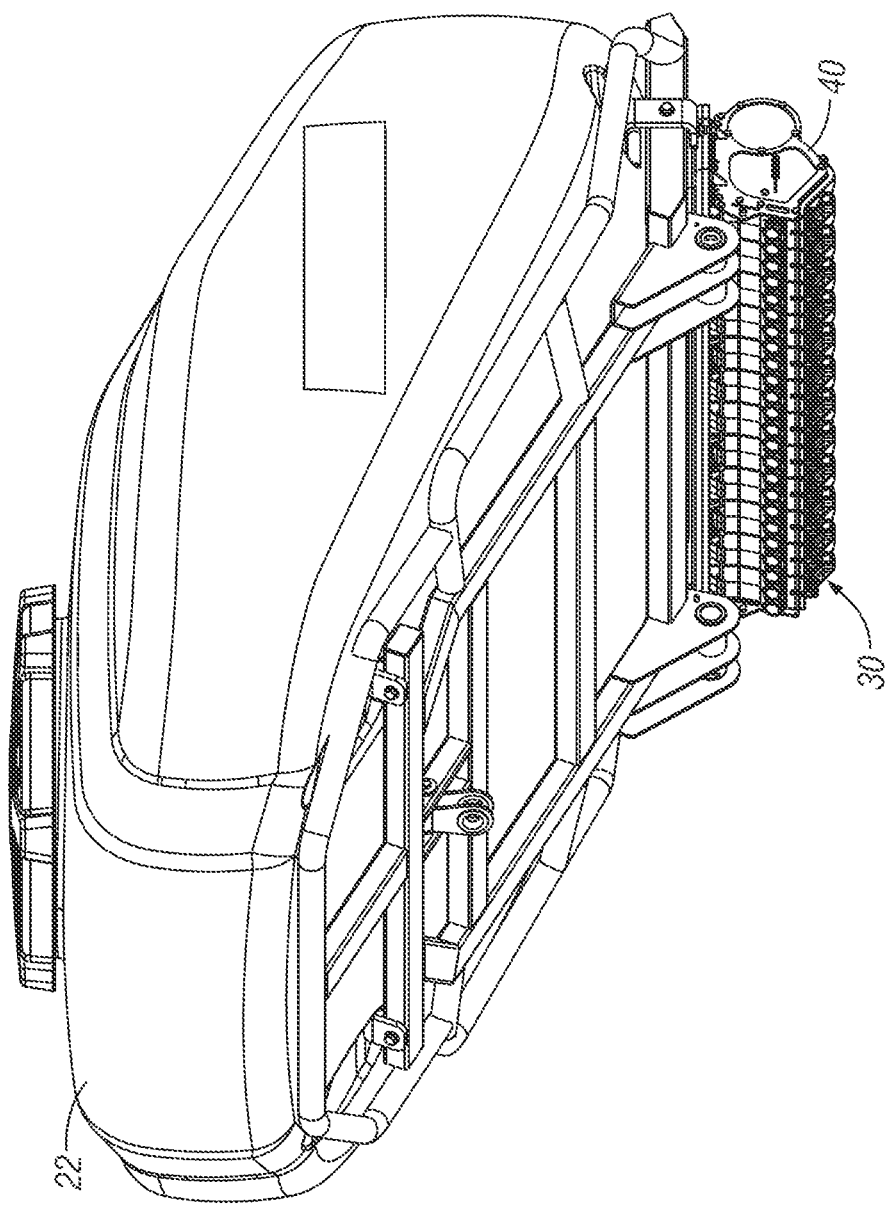
FIG. 5 is another perspective view of the system of FIG. 4.
Figure 6:
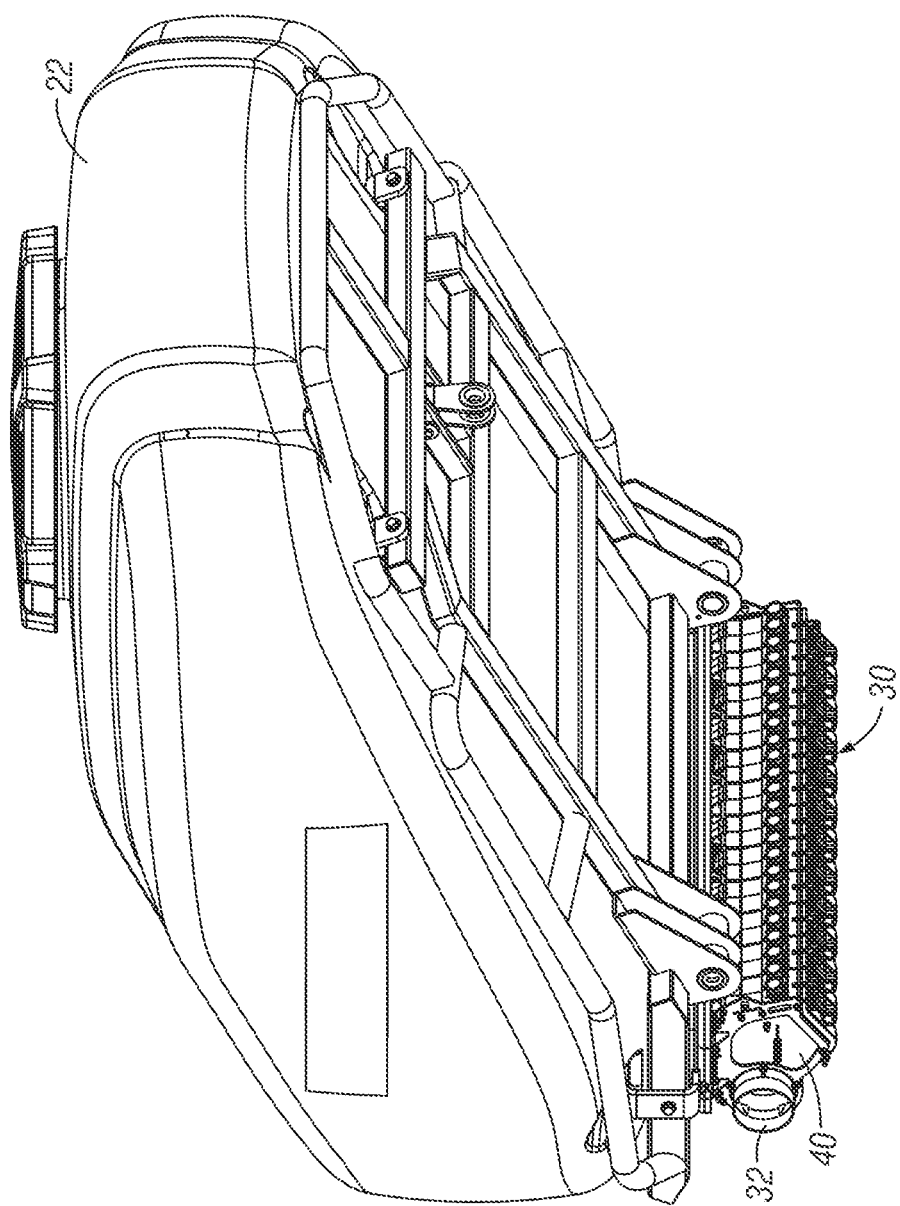
FIG. 6 is another perspective view of the system of FIG. 4.

Still further, the figures show the inclusion of hoppers 22 in the form of bulk hoppers. The figures show two hoppers 22 positioned generally on the implement 10. As will be understood the hoppers will hold a rather large amount of particulate material that can be distributed to the row units 20 along the length of the toolbar 16 to apply and/or distribute the particulate material via the row units 20. FIGS. 4-6 show additional elements of an exemplary bulk hopper 22 including aspects of the invention. The shape and size of the hopper 22 is not dispositive on the invention itself, except for the fact that the hopper 22 will be able to hold an amount of material to be distributed to multiple row units for use therein, with the goal being that the hoppers will not be refilled as often as smaller hoppers potentially positioned at each of the individual row units. To aid in distributing the material from a hopper 22 to a plurality of row units 20, such as smaller hoppers at the row units, aspects of the invention include a seed delivery assembly 30. The seed delivery assembly 30 is a fluid driven assembly that includes a plurality of entrainers 40. Previously, as shown in FIG. 6, a single pressure source 32 would be connected to the entrainers 30 to provide a fluid pressure thereto. However, aspects of the invention, as will be understood, may include additional pressure sources, such as for smaller banks of entrainers or even for each entrainer individually.

The entrainers 40 are pivotably mounted and/or otherwise connected to the assembly 30. The entrainers 40 are preferably divided into individual units and/or subsets (e.g., groups of two or three entrainers 40) 40a-n which each include an integrated, electric fluid pressure source 39 responsible which provides pressure to particulate materials so as to move the particulate material toward an end location, such as the row units 20, where they can be distributed to the ground. In some embodiments, such as the ones shown in FIGS. 7-9, the integrated, electric fluid pressure source 39 is an electric fan 49 designated for use with one or less than all of the segments of the entrainer to increase speed of planting, reduce downtime, optimize distribution, and facilitate repair with respect to the implement 10. However, it should be appreciated that other types of fluid sources, such as those providing a pressurized amount of a fluid can be used to combine with the particulate material of the hopper 22 to be distributed towards the row units 20 of the planting implement 10. Such additional sources could be hydraulic fans or the like. Furthermore, as will be understood, the assembly 30 is positioned generally below the hoppers 22 to aid in the use of gravity of the particulate material to move from the hopper 22 into the entrainers 40 of the assembly 30.

As will be understood, other fluid pressure sources 132 and/or flow controls can be used to supplement to or in lieu of the integrated, electric fluid pressure source 39 to further the objections of the invention. For example, pressure of the airflow can be increased via use of valves, baffles (e.g., 138, 139), inserts, nozzle-like configurations, etc. Pressure of the flow can also be increased by including, in isolation or in addition to any of the aforementioned elements, an integrated, electric fluid pressure source 132 positioned at the row unit 20 and configured to pull the air through seed apertures of a plurality of seed discs. Pressure of airflow from the other fluid pressure sources 132 and/or integrated, electric fluid pressure source 39 can be measured through the use of pressure gauges, such as a digital gauge placed near the row unit and/or an analog vacuum gauge mounted directly to negative pressure source and/or any other desirable location within the various manifolds included in the assembly 30. The use of pressure gauges can further help operators of the planter monitor whether the planter is operating under ideal conditions. Decreased flow measured at the row unit 20, for example, could suggest to the operator that entrainment assembly 30 or an electric fluid pressure source 132 should be cleaned out.

The use of one or more pressure gauges can also be particularly beneficial where monitoring pressure at one or more row units allows the system to more intelligently compensate for distance/product rate of particulate material at each row unit. As mentioned above, extra pressure may be needed at outer rows, but it is also to be appreciated there may exist non-typical situations where extra pressure is only temporarily needed and/or not needed. In such situations, it could be beneficial to selectively operate certain fluid sources 39$n$ (e.g., fluid sources near the outer rows) only when needed. For example, the fluid sources 39$n$ near the outer rows could be turned only when not operating said the fluid sources 39$n$ fans would result in substantially less pressure at the outer rows. If pressure from the fluid sources 39$n$ near the inner rows remains sufficient for purposes of efficient planting at the outer rows, said fluid sources 39$n$ near the outer rows could remain turned off.

Figure 7:
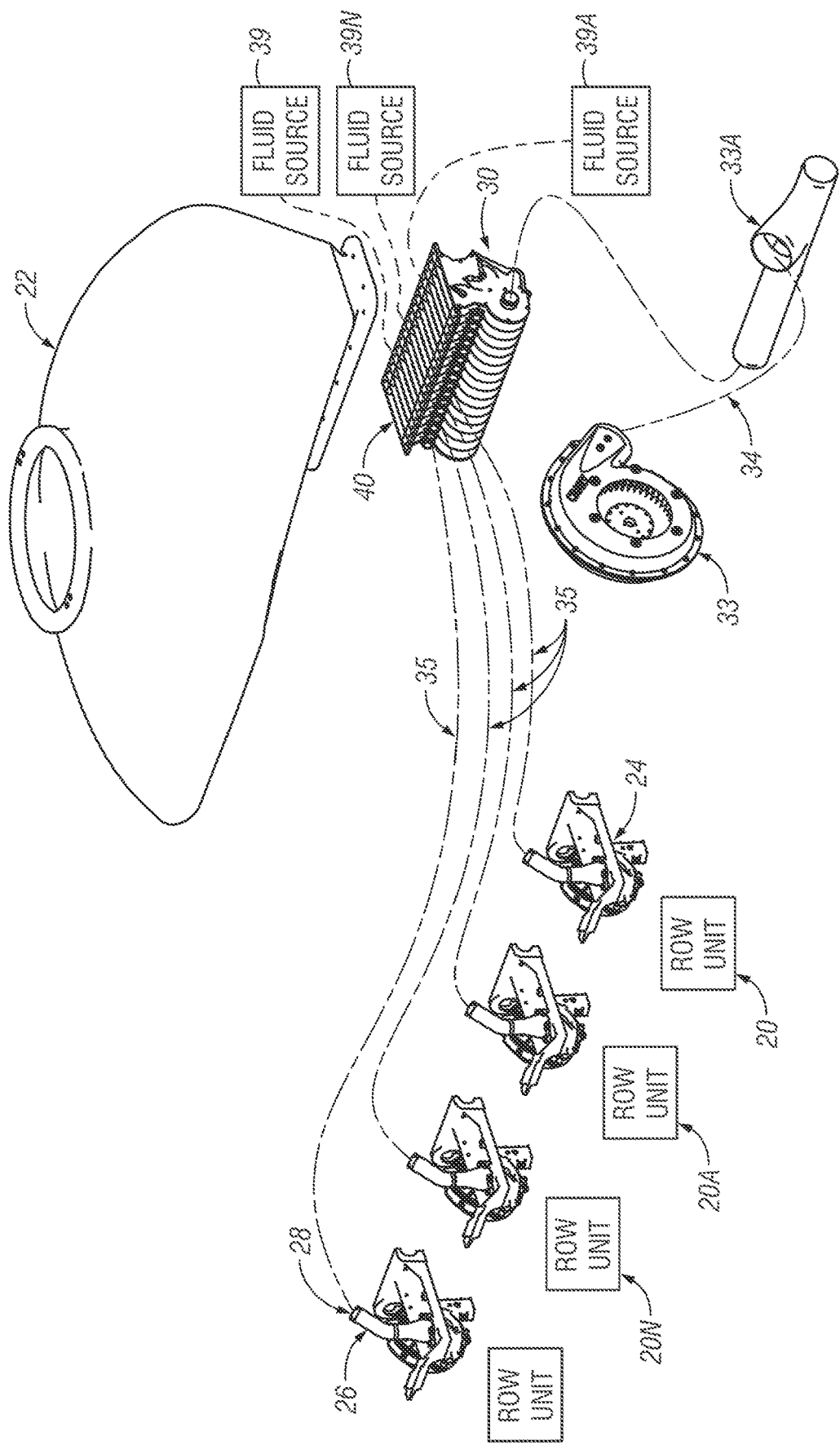
FIG. 7 is a perspective diagram, partly in schematic form, of the air seed delivery system incorporating an air entrainment assembly.
Figure 8:
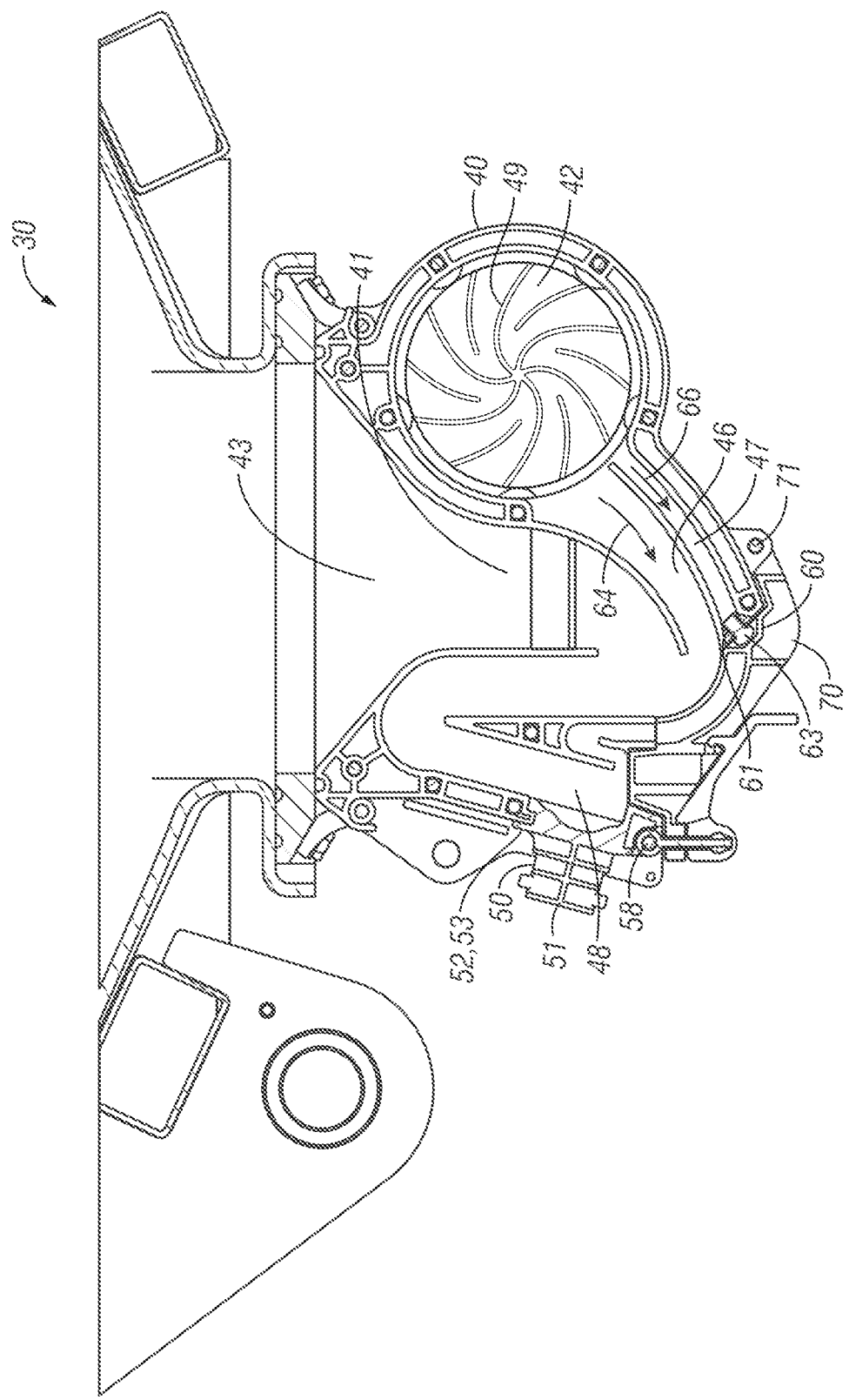
FIG. 8 is a side sectional view of an entrainment device connected to the air entrainment assembly.

FIG. 7 is an exemplary schematic showing a system utilizing concepts of the invention. As shown, a bulk hopper 22 is provided and a seed delivery assembly 30 is positioned generally below the hopper 22. The assembly 30 includes a plurality of air entrainers 40 in linear succession and positioned below the hopper 22 to receive the particulate material from the hopper 22 into the entrainers 40. As shown in FIG. 8, a fan 49 is operatively connected, such as via a conduit or manifold in fluid communication with an inlet 32 of at least one of the entrainers 40, and provides pressure to a flow path through each subset of segments 40 and/or each individual segment 40. Outlets 48 of the entrainers 40 are connected to row units 20, 20$a$, 20$n$, etc., via conduits 35. The conduits 35 may take the form of tubing, hoses or other conduits which can contain and transfer an amount of particulate material and/or fluid between the assembly 30 and the row units. Furthermore, the row units can be numbered generally as need in amounts, and therefore, the designation of 20$n$ is to designate as many row units as are found on a planter or planting implement 10. Similar designations for fluid source 39$n$ are used to designate as many fluid sources as there are subsets 40$n$ of segments in the assembly 30.

As will be appreciated, use of a fan 49 for each individual subset may require barriers and/or sufficient spatial clearance between separate subsets of segments 40 so that operation of one fan 49 does not interfere with another.

The use of an integrate fan 49 for each segment or subset of segments will provide many advantages for the system. For example, the use of the fan or fans 49 will provide greater control on a segment-by-segment basis. This would allow for variable rate pressure to be applied to the segments or subset of segments, which will optimize the distribution of the seed or other particulate material from the bulk hopper(s) to the row units. This will also allow for individual or subsets of segments to be activated at a given time to provide the on-demand supply of the seed or other particulate material to be distributed to the row units of the planter or other implement.

As noted, planters and other implements can include a number of row units with ground-engaging components that are used to apply (plant, distribute, spread, broadcast, etc.) a material or materials to a field. As can be appreciated, the distance of conduits from the entrainers to the inner row units is much less than the distance to the row units at the outer portions of the wings of the toolbar. Therefore, to apply a common amount of particulate material to both, varying amounts of pressure may be required. When a single pressure source, i.e., a fan, is used, this generally requires operating the fan at the highest needed output levels for all entrainers, which can require a higher input of power or energy to operate. Including a single, integrated fan at each entrainer, or even a fan for multiple entrainers in subsets, would reduce this energy input, and would allow each fan to be operated at the level needed to distribute or convey the particulate material to the designated row units. When the distance is shorter, the fan can be operated at a lower speed to maintain the desired amounts of material. When the conduit distance is greater, the select fans can be operated at a higher level. However, this optimization of the fans will increase the overall efficiency of the system as a whole, which will allow the power to be used for other aspects of the implement or tow vehicle.

Still further, having a plurality of fans, such as for each entrainer, will allow for a greater amount of material to be delivered to the row units. This is especially beneficial when planting or otherwise applying at higher speeds. For example, U.S. Pat. No. 10,842,072 discloses a system that allows for greater control in precision planting, as well as the ability to plant at higher speeds (e.g., speeds at and above 10 mph). Planting at such speed may use the seeds and other particulate materials in a greater rate. Therefore, moving the seed and/or particulate material from the bulk hoppers to the row units becomes even more important in order to keep up with the use of the material, via application (e.g., population, speed, volume, etc.). Having the plurality of fans for each segment or subset of segments will allow the entrainment system to keep up with the desired amounts of material in a more efficient manner.

Furthermore, as is shown in FIG. 7, at least one metering member 24 such as a seed meter 142 (shown in more detail with reference to FIGS. 14-15), is positioned at each row unit 20 and includes a seed inlet 26 and a seed port 28. The seed port 26 can be connected to the seed delivery assembly 30 via the conduit 35 with the seed port 28 allowing the connection and passage of the seed or other particular matter to be distributed from the assembly 30 to each of the metering members 24 of each of the row units 20. Therefore, the seed delivery assembly 30 will be disclosed in which a novel and unique system will be applied to various components thereof, in order to efficiently and accurately provide an on demand amount of seed or other particulate material from one or more hoppers of an implement to one or more row units, and in particular, to one or more metering elements of each of the one or more row units to be distributed, applied, or otherwise delivered via the row units to the ground.

As noted, a subset 40*n* of the assembly 30 will include an inlet 32 for passing air into at least a portion of the assembly 30, wherein the inlet 32 is connect to a fluid source 39*n*. The assembly 30 is comprised of a plurality of entrainers 40*n*, which may also be referred to as entrainment members, segments, or the like. The plurality of entrainment segments 40 are connected to one another to allow the fluid from the inlet 32 to pass through each of the segments 40 to be utilized to move the particulate material delivered to each of the segments 40 from the segments and to the one or more row units of the planting implement. Each segment 40 includes an opening at the upper end comprising a seed entrance 41. Furthermore, each segment 40 is separated into first and second sides such that each segment 40 will have a first seed entrance 41*a* and a second seed entrance 41*b*, which is separated by an inner wall 43. Therefore, as will be understood, each segment 40 will be utilized to deliver a particulate material, e.g., seed, from the segment 42 one or multiple row units via each segment 40. This will be disclosed further and will be able to be understood herein. The seed passes into the portions the first and second sides of the segments 40 via the entrances 41*a*, 41*b* and is separated by the inner wall 43. Furthermore, each segment is defined by a first outer wall 44 and a second outer wall 45 to designate and define the boundaries of the segment 40. Each segment will also include one or two outlets 48 and can include an outlet insert 50 which includes seed exits 51*a*, and 51*b*, which corresponds to the first and second sides of each segment. However, as will be understood, additional outlets can be utilized to provide for the seed for other particulate material of each segment to be delivered to one or multiple row units.

Figure 9:
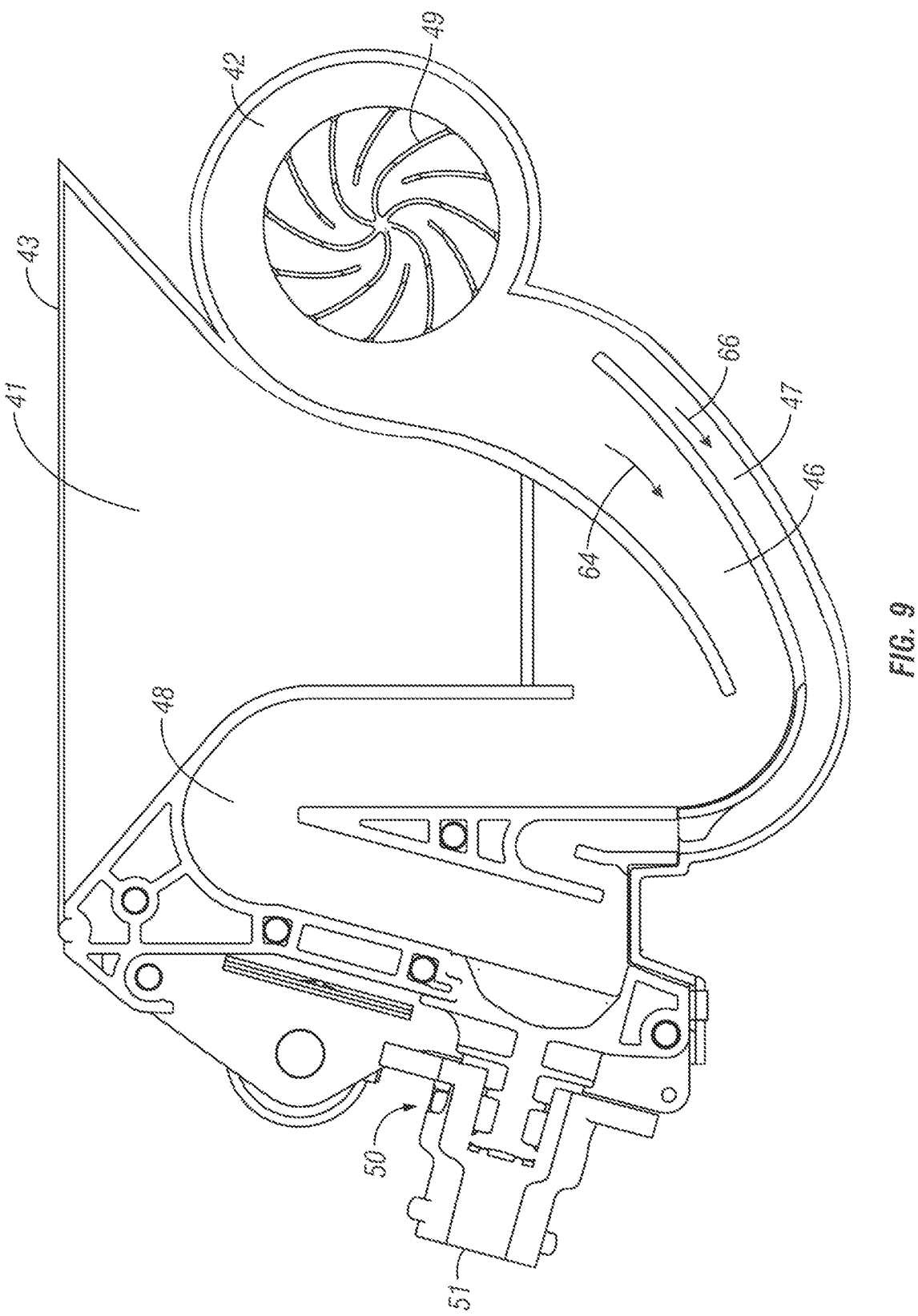
FIG. 9 is a detailed side sectional view of the entrainment device of FIG. 8.

The entrainer 40 can include an outlet insert 50 positioned generally at an outlet 48 of the entrainer segment 40. As will be understood, the outlet insert 50 can vary and direct the seed or other particulate material from the entrainer segment 40 to one or more row units, such as via the outlet 50. Such inserts are shown and described in greater detail in U.S. Pat. No. 11,212,957, which is hereby incorporated by reference in its entirety. For example, as is shown in FIG. 9 of the present disclosure, the outlet 50 includes seed exit(s) 51. The exit(s) 51 of the seed from an entrainer segment 40 can be combined and sent to a common location, for instance with a different outlet insert. Additional elements show in FIG. 8 include a clean outdoor 70, positioned generally on the underside of an entrainer segment 40. A cleanout door 70 can be rotatably or pivotally connected to the entrainer segment 40 such that it is selectively connected to selectively open and/or close the door 70. When opened, the entrainer segment 40 can be cleaned out, such as by gravity or other cleaning methods to remove the remainder of any particulate material from the interior of the entrainer segment 40. Also included in FIG. 8 and shown by the removal of the cleanout doors 70 a bypass insert 60. Such a bypass insert is also shown and described in the '957 patent.

Other beneficial seed gates, sliding members, removable gaskets, quick release latches, and/or cleanout chutes can be employed in addition to the cleanout doors 70 and bypass insert 60, or lieu thereof. Such seed gates, sliding members, removable gaskets, quick-release mechanisms, and/or seed chutes can be configured to stop seed and/or air from flowing between the assembly 30 and the bulk fill hoppers 22, through one or more of the fluid paths 46-47, near the exit 51, etc. This can further facilitate the operator clean out the entrainer segment 40, such as where operator wishes to change hybrids, change crops, clean out the assembly 30 at the end of the planting operation, or for storage at the end of the planting season. In another example, in instances where unwanted debris, such as bag tags, get lodged therewithin, the operator has the ability to remedy detrimental effects to the planting operation and/or operation of the assembly 30 and to continue planting with desired populations and speeds for planting.

As will be understood, each of the entrainer segments 40 include different passages, including, but not limited to, a main passage for fluid and particulate material, and a bypass channel for bypassing an amount of fluid in which the bypass fluid does not immediately interact with a particulate material and instead recombines with a combined amount of fluid and particulate material at or near the outlet 48 of the entrainer segment 40 in order to increase and/or aid in the movement of the particulate material from the entrainer segment 40 and towards the row unit and/or seed meter. The bypass insert(s) 60 are shown to be of varying widths and can be included in some embodiments to adjust an amount of airflow passing through a bypass channel. This easy inclusion of such an insert 60 can quickly and easily adjust an amount of airflow to account for varying lengths of conduits extending between a particular entrainer segment 40 and its end-use location, i.e., row unit and/or metering member. Therefore, the use of the inserts can be selective when it is determined that an amount of air flow to move the particulate material is needed to be increased and/or decreased, or otherwise regulated and provides over uses of sleeves in that they are easily included and removed on an as needed basis. For example, when the length of the hose is increased, such as when the number of row units and thus the width of a tool bar is increased, the insert can be included to reduce the bypass air and to increase the amount of air passing through the main passage and into combination with the particulate material. In some implements, the further rows can be approximately 90 feet from a particulate entrainment segment 40, and thus it may require higher amounts of air to be combined with a particulate material and used to deliver the particulate material towards the row units at the greater distance. However, when the conduits length is shortened, the inserts may not be required, and the bypass air can aid in passing and providing an on demand amount of seed or other particulate material to the row units and/or seed meters.

As will be further understood, the entrainer segments 40 will preferably include primary fluid path(s) 46 as well as bypass path(s) or channel(s) 47. These are positioned on opposite sides of the inner wall 43 of the entrainer segment 40. The insert 60 can be positioned generally on the inner wall 43 and can extend into both bypass channel(s) 47 to adjust the amount of airflow passing therethrough. This can also aid in increasing the air flow by reducing the cross-sectional area of the bypass channel(s) 47, which work as a sort of nozzle to increase or decrease the airflow passing before the bypass air recombines with the air that is passed in the primary fluid channel 46 and has combined with an amount of particulate material. Therefore, the width of the insert(s) 60 can thus vary the amount of air passing through the bypass channel 47 to increase or possible even block the air from moving through the bypass channel. However, the width can be changed as needed to create the nozzle effect as well.

In greater particularly and with reference to the cleanout door 70, a connection can be formed with a pivot portion 71 in which the door is able to pivot to open and close access to an underside of the entrainer segment 40. The door can be selectively closed or opened via a latch or other mechanical means to close and at least partially seal the underside of the entrainer segment 40.

FIG. 9 is a side section view of an entrainment device 40 connected to the assembly 30 and hopper 22 thereof. As shown, each entrainer segment 40 is generally a first outer wall 44 and a second outer wall 45, and the interior sections being split with an inner wall 43. The position of the inner wall 43 is generally equal distance between the first and second walls 44, 45, but this is not necessary, and the first and second sides of the entrainer device can vary such that the inner wall 43 is off set to provide one side being larger than the other. The entrainer segment 40 includes seed entrance(s) 41 on opposite sides of the inner wall 43. As noted, seed can be feed to the entrainment 40, such as via gravity from the hopper 22 and into the entrance(s) 41. Air or other fluids can enter the entrainment subset 40*n* of segments 40 via the entrance 42, which is generally transvers to the seed entrance(s) 41. As noted, the segments 40 of a subset 40*n* are connected to have generally common or aligned fluid inlets 42, and as will be understood, the fluid can be dispersed into the individual entrainment segments 40, such as moving in a perpendicular or otherwise transvers direction into the interior of the segment 40, as will be understood. A door 70 is positioned at an underside of the entrainer segment 40 to provide closer thereat. Furthermore, the entrainment segment 40 as shown in FIG. 9 includes an outlet insert 50 positioned generally at the outlets 48 of the entrainer segment 40. The outlet insert 50 can be positioned at the outlet to provide connection to one or more row units 20 and/or metering units 24 to provide an amount of on demand particulate material from the entrainment segment 40. For example, in the embodiment shown in FIG. 9, the outlet insert 50 includes to exit(s) 51. The exit(s) 51 can be connected to different or common metering members 24 and/or elements of row units 20 of an implement 10. The use of multiple exits can provide for flexibility to have one entrainer segment 40 be used to feed or otherwise provide an on demand amount of particulate material to multiple and uses. The insert 50 can be connected to the entrainer segment, which will be understood, at a pivot connection 58 at a lower end, wherein the insert 50 can be pivoted to selectively be connected to the particular entrainer segment 40.

FIG. 9 shows one side of an entrainer segment 40 such that the inner wall 43 at the seed entrance or particulate matter entrance 41. As noted, the particulate matter will enter the entrainer segment 40 via gravity at or near the entrance 41 and can rest or pool temporarily at a wall. Air or other fluid enters the entrainment segment 40 via the air inlet 42, where it will be separated into the primary fluid path 46 and the bypass path 47. The air moves in the direction of the arrow 64 into the primary fluid path 46 and in the direction of the arrow 66 into the bypass path 47. The arrow or the fluid of the primary fluid 46 will combine with the particulate material that has pooled in the seed entrance 41 and from the inlet 42 towards the outlet 48. The air in the bypass path 66 will continue as well towards the outlet 48 and can interact the insert 60 which may be positioned at least partially in the bypass path 47. As noted, the insert 60 can be included to adjust the amount of airflow passing therethrough and can increase and/or decrease the air flow passing through the bypass path before it combines with the combination of the primary air and the particulate material. The bypass air will then continue towards the outlet 48 where it will be combined with the combination of the primary air and the particulate material and will be directed in the direction of the arrow 69 out the outlet 48 and into the outlet insert 50. The seed will then be delivered via the insert 50 and via the exit 51 of the insert 50 and towards the end use, such as via a conduit towards the row unit and/or metering member thereof. As noted, the outlet insert 50 can be connected to the entrainment device 40 via a pivot point 58 and a lift and channel connection 52, 53.

Furthermore, the insert 60 can be positioned generally at the inner wall 53 and extending into the bypass path 47. The insert 60 can include a tab 63 which can attach and temporarily adhere or otherwise be connected to the inner wall 53 within the bypass path 47. The insert is shaped to fit within the bypass path and includes a beveled portion 61 which utilizes the force of the fluid itself to aid and preventing or otherwise mitigating movement of the insert 60, 62 while in the bypass fluid path.

As shown in FIG. 9, the entrainment device 40 can be made free from 90°, substantially orthogonal corners, and other such mechanisms causing sharp edges. The smooth profile of walls within the entrainment device 40 helps air interact directly with seed and pass seed out through outlet 48, exit 51, and to the rows. Moreover, the smooth profiles of the walls defining paths 46, 47 helps pass seed at a high-speed during planting. This can help the entrainment device accommodate passing a higher number of seed types (and thus crop types) through the entrainment device 40. Said crop types can include, but are not limited to, wheat, barley, rye, corn, sweet corn, soybeans, sunflowers & confectionary sunflowers, sugar beets, grain sorghum, cotton, canola, hemp, and other cover crops. In effect, a wider range of populations and speeds for planting can also be achieved. On top of supporting higher speeds of planting, the entrainment device of the configuration shown through FIGS. 8-11 can support not only seeds of a larger maximum size, but also seeds that are heavily treated and/or seeds with heavier coatings.

Figure 10:
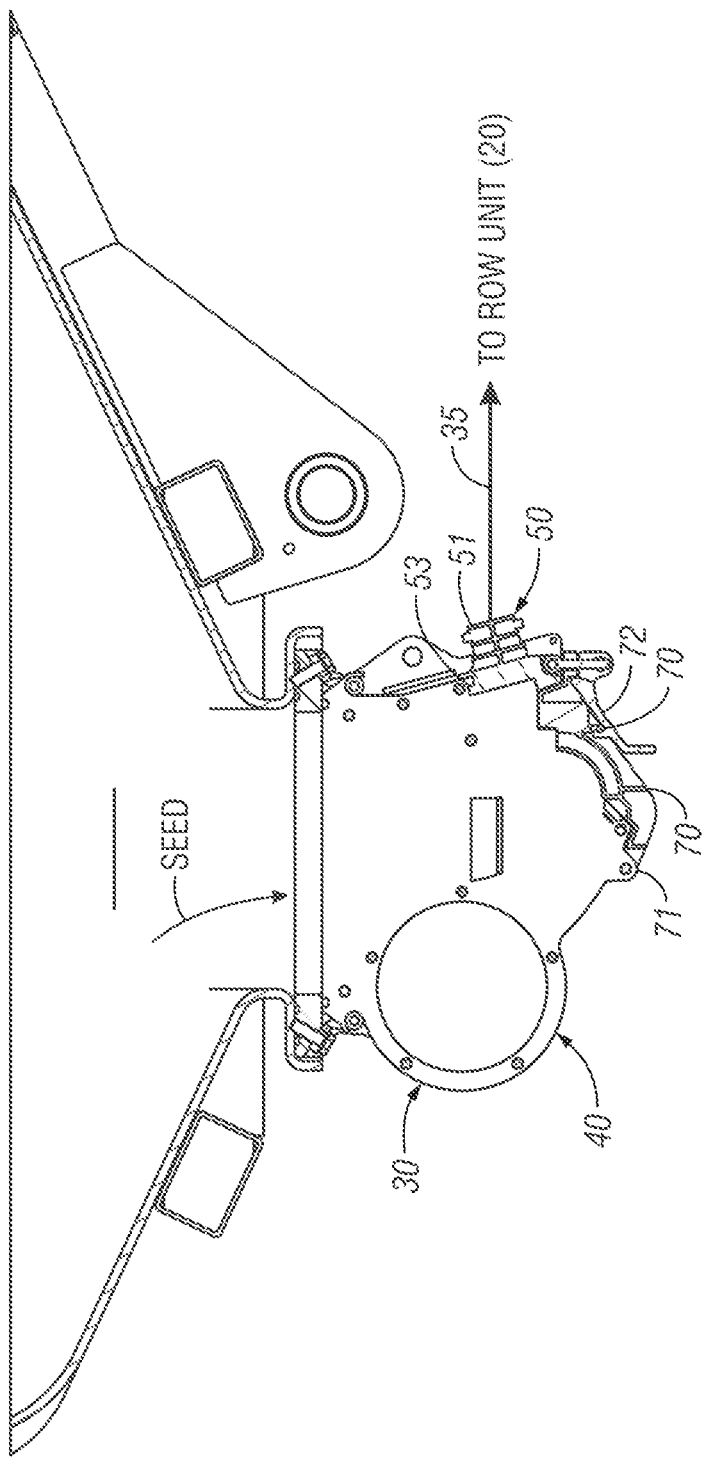
FIG. 10 is a side elevation view of the entrainment device of FIG. 8.

FIG. 10 is a side elevation view of an end of the assembly 30 and shows insert 50 with the exit 51. As understood, the exit 51 is towards the rear of the assembly 30 to be delivered to and use locations, which may include row units, metering members, ground engaging elements, or some combination thereof. The end of the assembly 30 is not the fluid entrance side, as there is no entrance shown into the plurality of segments 40. As noted, the seed will pass into the segments and the air will direct and combine with the seed to direct the combined air and seed out the segments and via the insert 50 by way of the exit 51 towards a row unit 20 or other end use application, such as via a conduit 35.

Figure 11:
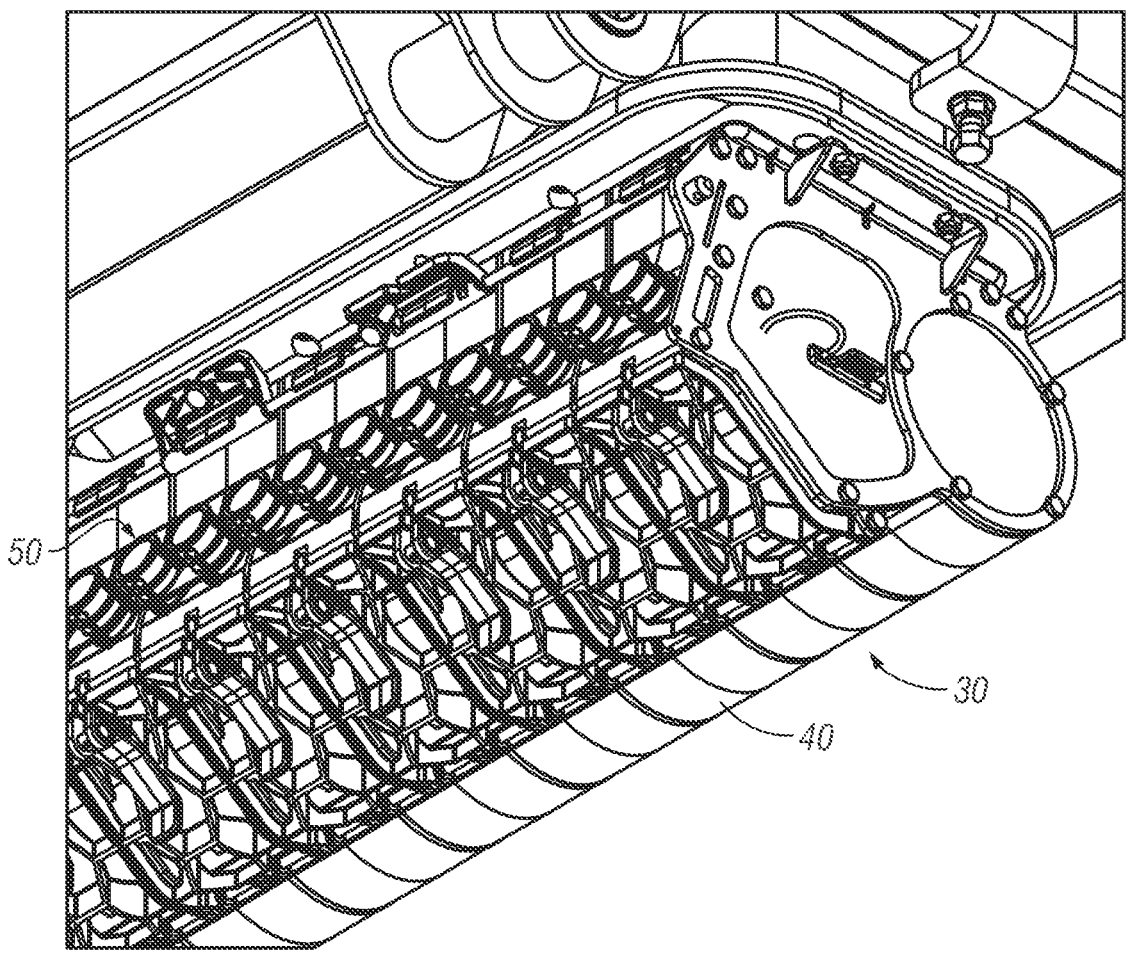
FIG. 11 is an enlarged view of a portion of the system of FIG. 7.

FIG. 11 is another view of the assembly 30 showing the plurality of segments 40 with the insert 50 attached thereto, stressing the importance of proper spacing between the subsets 40*n* so that fans 49 can be optimally utilized and fan stacking does not hinder performance of the assembly 30. The configuration shown throughout FIGS. 8-11 enhances the flow of both air and seed. The configuration allows for there to be no substantial mechanical agitation in the tank (e.g., bulk hopper 22) or in the entrainment device 40 at the bottom of the tank. During operation, airflow can be continuously sent through the assembly 30 (never stops). The moving parts within the assembly 30 can thus be substantially limited to just air in the system itself.

Figure 12:
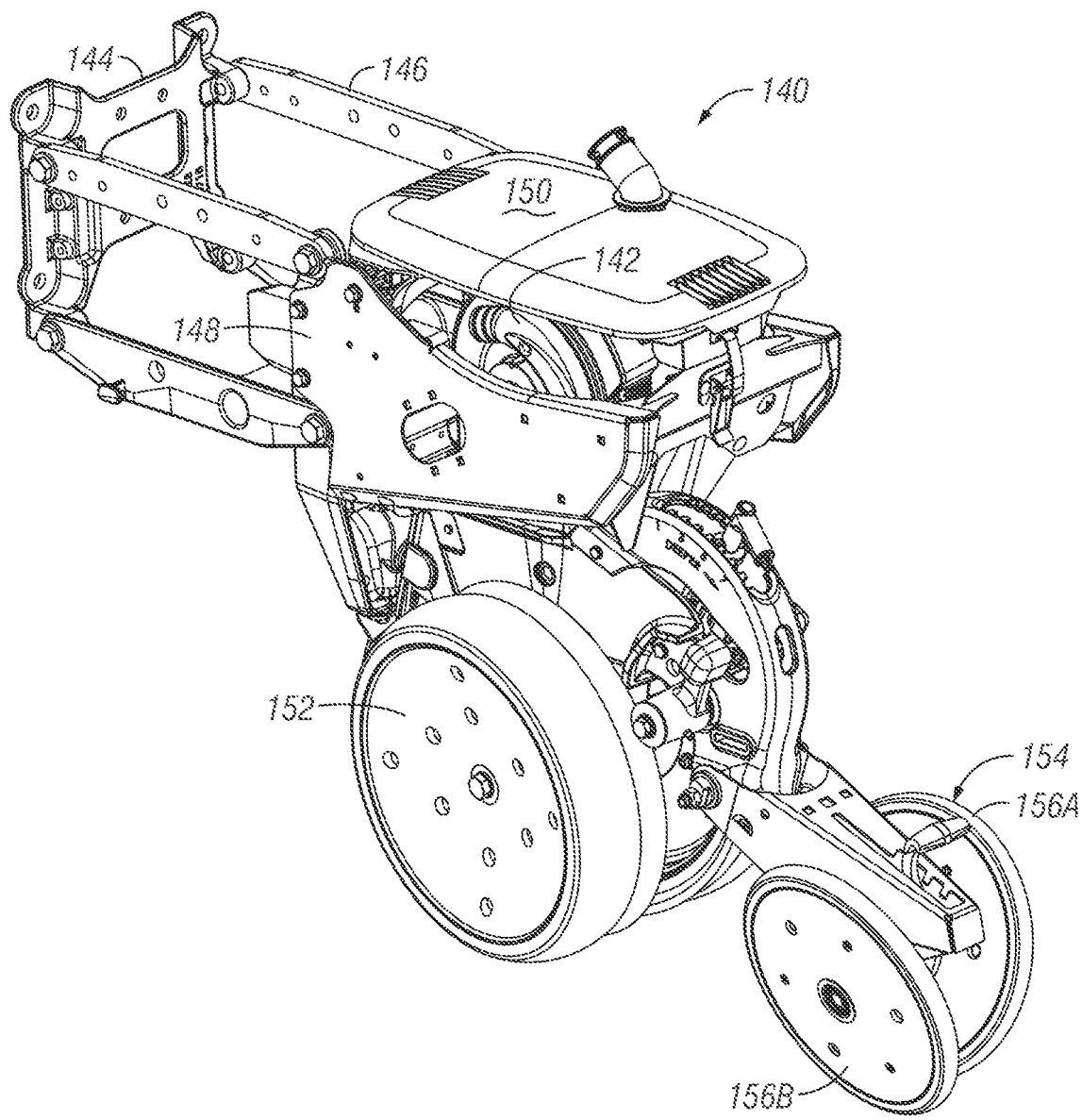
FIG. 12 is a perspective view of a planter row unit with an air seed meter attached thereto.
Figure 13:
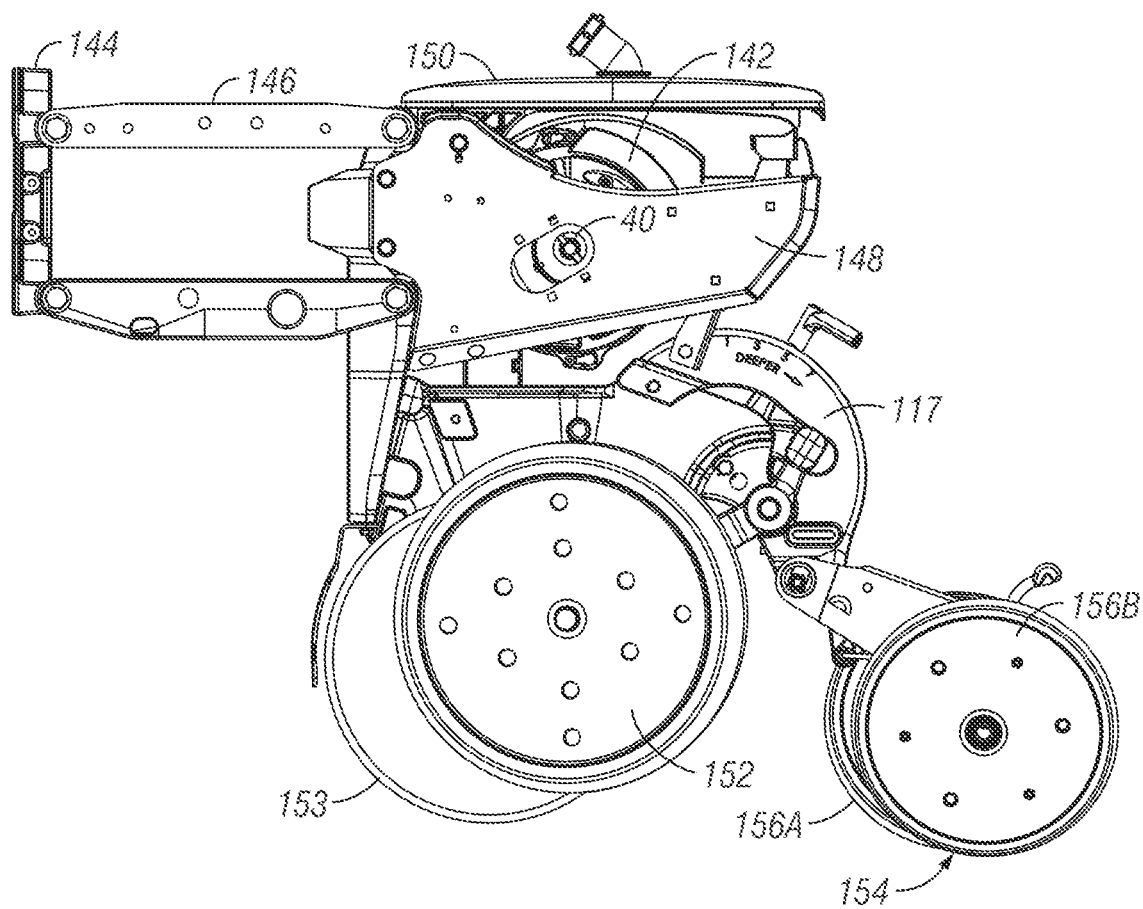
FIG. 13 is a side elevation view of the row unit.

As mentioned, the implement 10 includes a plurality of row units 20 extending from the wings 17, 18 and the toolbar 16. A planter row unit 20 with an air seed meter 142 positioned therewith is shown in FIGS. 12 and 13. For example, the seed meter 142 may utilize a negative or positive air pressure to retain and transport seed about one or more seed discs within the seed meter housing. The row unit 20 and air seed meter 142 may be of the kind shown and described in U.S. Pat. No. 9,282,691, which is hereby incorporated in its entirety. The invention contemplates other types of seed meters, including mechanical, brush, finger, or the like, which may be used with the invention. In addition, as will be understood, the seed meter may be a multi-hybrid seed meter that is capable of dispensing one of a plurality of types, varieties, hybrids, etc. of seed at a row unit, such as by the use of multiple seed discs within the seed meter housing.

The row unit 20 includes a U-bolt mount (not shown) for mounting the row unit 20 to the planter frame or tool bar 16 (on central frame and wings 17, 18), as it is sometimes called, which may be a steel tube of 5 by 7 inches (although other sizes are used). However, other mounting structures could be used in place of the U-bolt. The mount includes a face plate 44, which is used to mount left and right parallel linkages 46. Each linkage may be a four bar linkage, as is shown in the figures. The double linkage is sometimes described as having upper parallel links and lower parallel links, and the rear ends of the parallel links are pivotally mounted to the frame 148 of the row unit 20. The frame 148 includes a support for the air seed meter 142 and seed hopper 150, as well as a structure including a shank for mounting a pair of ground gage wheels 158. The frame 148 is also mounted to a closing unit 154, which includes a pair of inclined closing wheels 156A, 156B. The row unit 20 also includes a pair of opener discs 153. While the row unit 40 shown in FIGS. 12 and 13 is configured to be used with a bulk fill seed system, it is to be appreciated that the row unit 20 may have one or more row hoppers 150 at each of the row units 20. Exemplary versions of row units with individual hoppers are shown and described in U.S. Pat. No. 9,420,739, which is hereby incorporated in its entirety.

The implement 10 and row units 20 shown and described in FIGS. 12 and 13 include an air seed meter 142 for singulating and transporting seed or other particulate material from the seed delivery source to the created furrow in the field prior to the closing wheels 56 closing said furrow.

Figure 14:
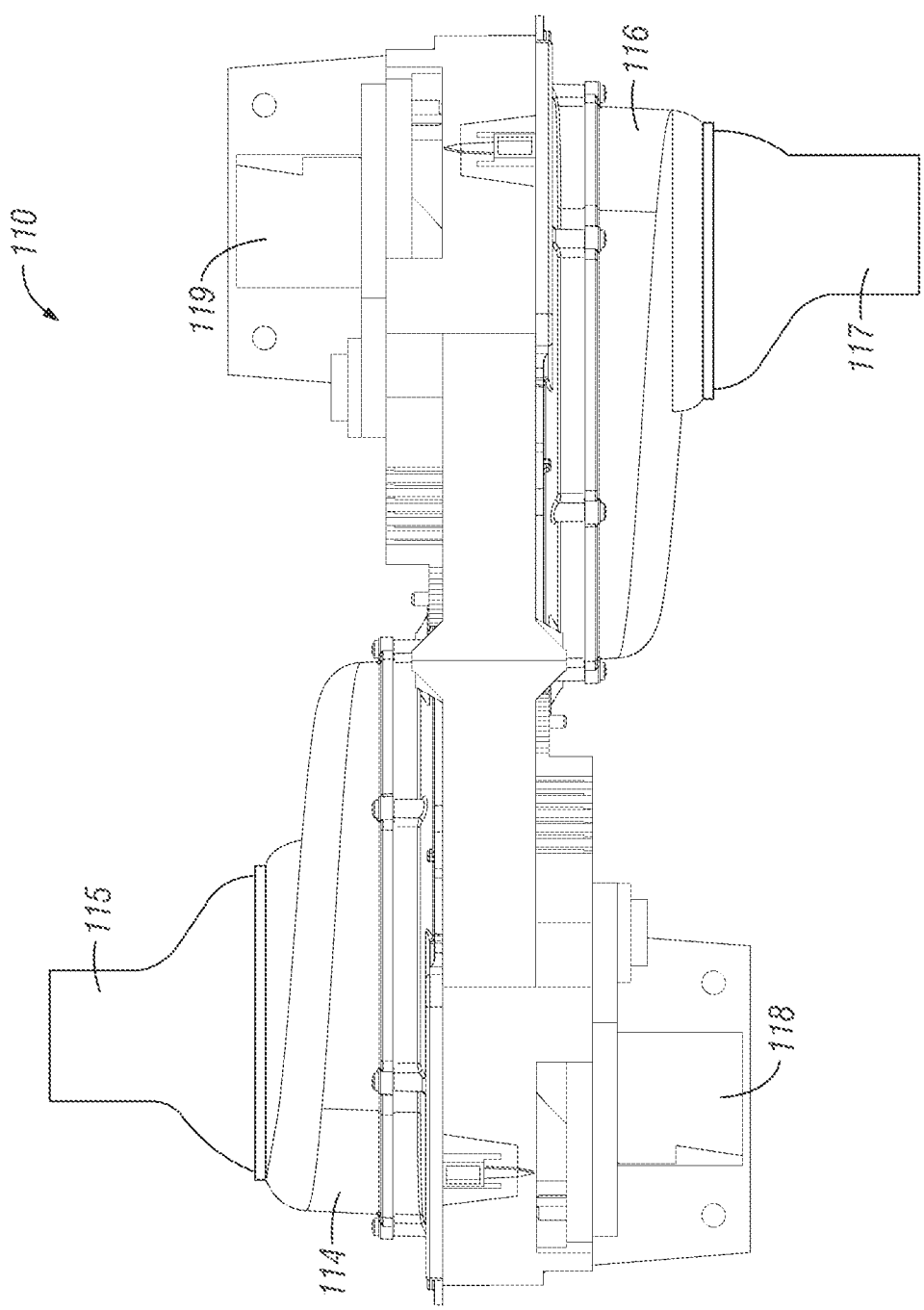
FIG. 14 is a top elevation view of a seed meter with pressure source connections.

A seed meter 110 with traditional air pressure source access members is shown in FIG. 14. The seed meter 110 shown in FIG. 14 includes a base or central housing 112 for accompanying first and second seed discs positioned within said housing. Thus, the seed meter 110 is shown to be a multi-hybrid seed type seed meter 110, wherein the seed meter is able to singulate and dispense at least two different types, hybrids, or varieties of seed by the planter as the planter moves through the field. The central housing 112 is a member that is generally mirrored sides or ends. A first meter housing 114 is shown to be positioned on one side, and a second meter housing 116 is shown to be positioned on an opposite side of the central housing 112. A first seed disc is positioned between the first meter housing 114 and the central housing 112, and these components may be collectively known as a "first meter," and a second seed disc is positioned within and between the second housing 116 and the central housing 112, and these components may be collectively known as a "second meter." In such a configuration, it has been standard to provide a centralized or regional air pressure source to provide an air pressure, whether it be positive or negative, for the seed disc. The seed meter 110 on a particular row unit 20 is connected to the central or regional air pressure source via hoses, which are not shown in the figures. The hoses attach to a first pressure source member 115 and a second pressure source member 117, as shown in the figures. Thus, the hoses must extend at times a substantially large distance. This can create clutter and an undesired look for a planter, in addition to adding the possibility of loss of pressure over the distance of the hose.

For example, the hoses must extend from the centralized or regional air pressure source and to row units that may be at the ends of the wings. When a centralized air pressure source is used, the pressure source may be positioned on the central frame of the planter, such as near the bulk hoppers. Otherwise, regional air pressure sources may be positioned at each of the wings of a planter. In either situation, particularly row units may be positioned a substantial distance from said air pressure source. Due to the distance, the air pressure may experience a drop or a loss between the source and the particularly seed unit 110 of a row unit 20. Therefore, the pressure source may be required to have a higher power or provide a higher source to account for said drop. This can provide a large power or energy requirement for a particular planter.

Figure 15:
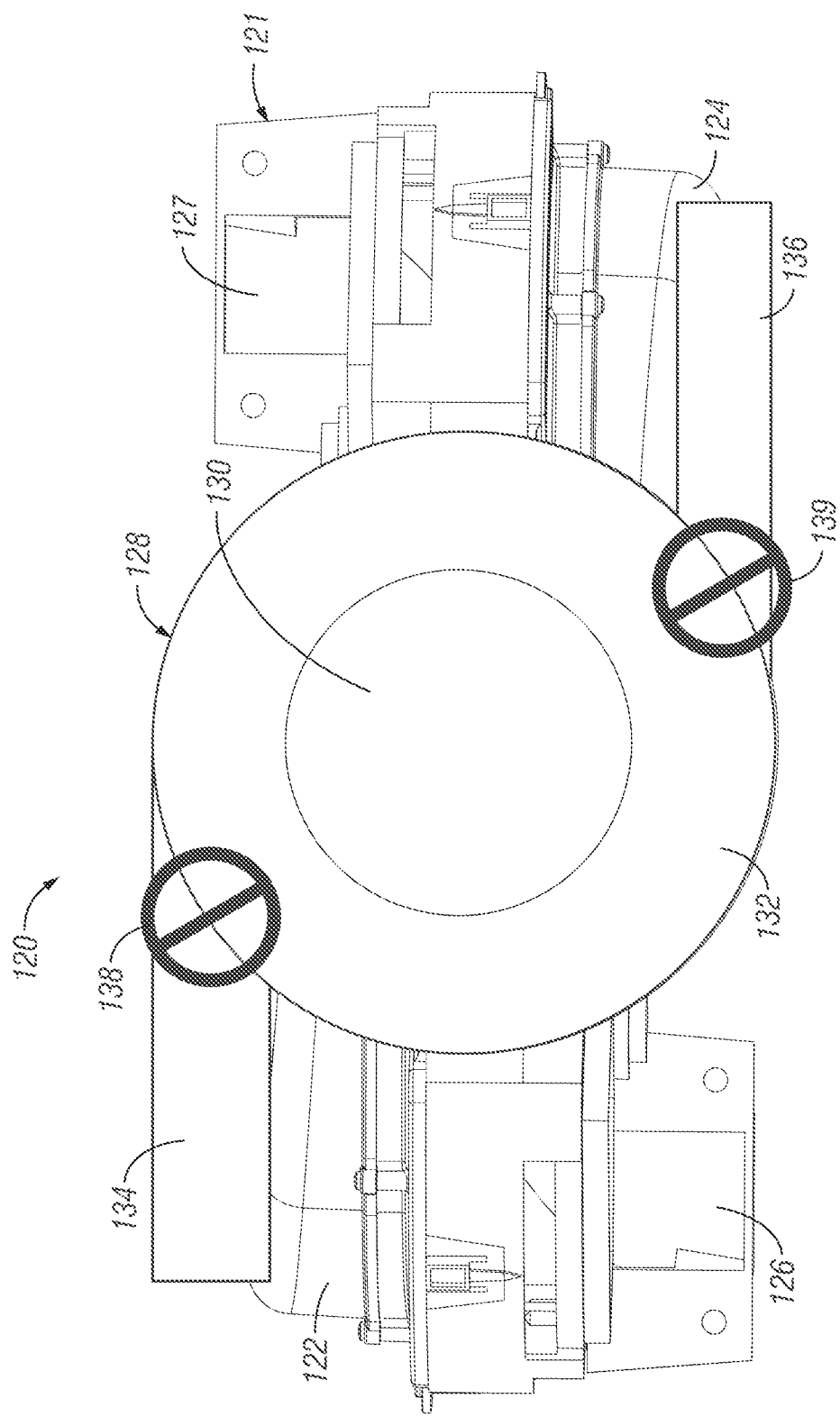
FIG. 15 is a top elevation view of a seed meter with two seed discs and a single air pressure source including valves for directing the air pressure source.
Figure 16:
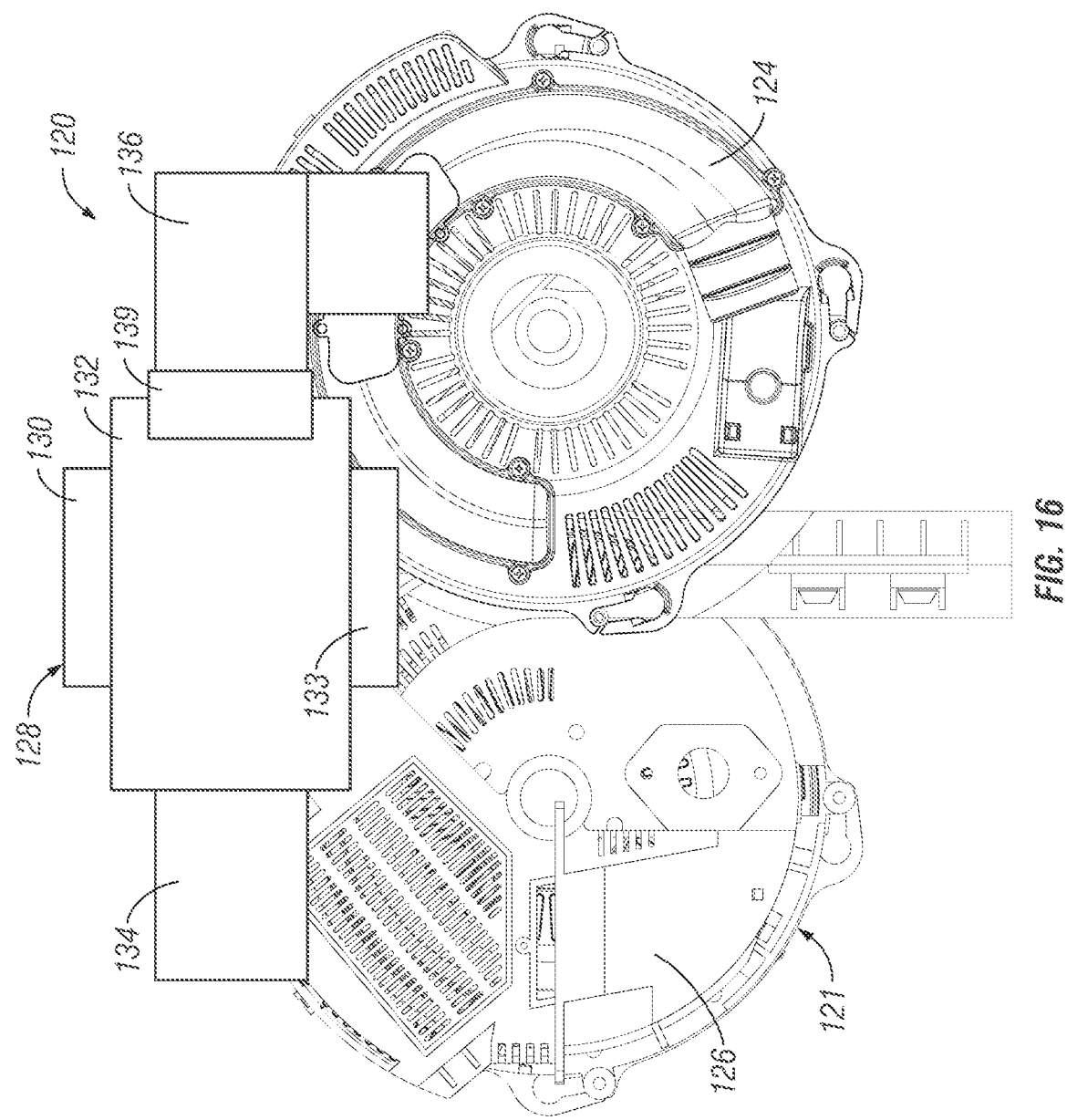
FIG. 16 is a side elevation view of the seed meter of FIG. 15.

FIGS. 15 and 16 show additional aspects of the disclosure, in which an electric and integrated pressure source 128 is utilized to provide air pressure to two seed meters 122, 124 of a seed meter assembly 120 of a row unit. The configuration includes a seed meter housing 121, seed pools 126, 127, for providing seed to discs of the first and second seed meters 122, 124. The integrated pressure source 128 includes an electric motor 130 and a vacuum fan or other air source 132, for providing the air pressure to the first and second seed meters 122, 124. In addition, a first duct 134 extends from the air pressure source 128 to the first seed meter 122, and a second duct 136 extends from the air pressure source 128 to the second seed meter 124.

However, the seed meter assembly 120 shown in FIGS. 15 and 16 differs from those previously shown and described, such as by the inclusion of first and second valves or baffles 138, 139. For example, the valves 138, 139 may be utilized to selectively open and close the air ducts 134, 136 such that the air pressure provided by the pressure source 128 is directed to only one of the first or second seed meters 122, 124. In other words, one air source 128 incorporates the use of automated or manually operated control valves 138, 139 to route air to or from one of two bifurcated paths to supply air to one of the two integrated seed meters 122, 124. The inclusion of the valves or baffles 138, 139, will increase the efficiency of the air pressure creates by the source 128 such that the full pressure created by the source will be dedicated to only one of the meters 122, 124. This can create the efficiency of the seed meter 120.

However, the valves can be operated, via either manually or automatically, to provide for any number or variations of air pressure from the pressure source 128 to either of the seed meters 122, 124 via the paths 134, 136. For example, when one of said seed meters is in use, it may be desired to have the valve completely open in order to provide a full amount of air pressure to said meter. The other said meter may be blocked completely of said air pressure, in such that the full air pressure is dedicated to the seed meter in use. In some situations, the valve for the seed meter not in use may be slightly opened such that the air pressure begins to be supplied to the seed meter not in use. This will begin providing pressure to the seed meter, such that when the meter begins operation, there will be less lag or potentially no lag in adhering the seed to the seed disc therein. This can aid in increasing the efficiency of the system, particularly when changing from one seed meter to the other.

As mentioned, the valves 138, 139 can be automated such that the system works to automatically open or close a valve as a particular seed meter is utilized. For example, the seed meters may be connected to a system, such as a GPS or other plotting system, to provide for a particular seed type, variety, or hybrid to be planted at a particular location in the field. The valves can be included in said system to know or learn of the changing of one seed being planted to the other via the seed meters. Thus, when the first seed meter 122 is to be shut off and the second seed meter 124 is to be operated, the valves can be alerted or know of such change, and can automatically open and close the proper valve in order to provide the air pressure to the seed meter that will be in use. As mentioned, the use of the valves to dedicate the air pressure to one of the plurality of seed meters associated with the system can increase the efficiency, such as by reducing the size of the fan or air source provider 132, as well as the power need for the motor 130, such as by requiring less pressure created by the air pressure source 128 to achieve the same volume of seed. Furthermore, while the system is shown to be used with two seed meters, it is to be appreciated that the inclusion of the valves can be incorporated with a seed meter of any number of seed discs and meters incorporated therein. Any addition of a duct and meter can include an addition of an additional valve positioned in or at the duct or between the additional seed meter and the pressure source.

Figure 17:
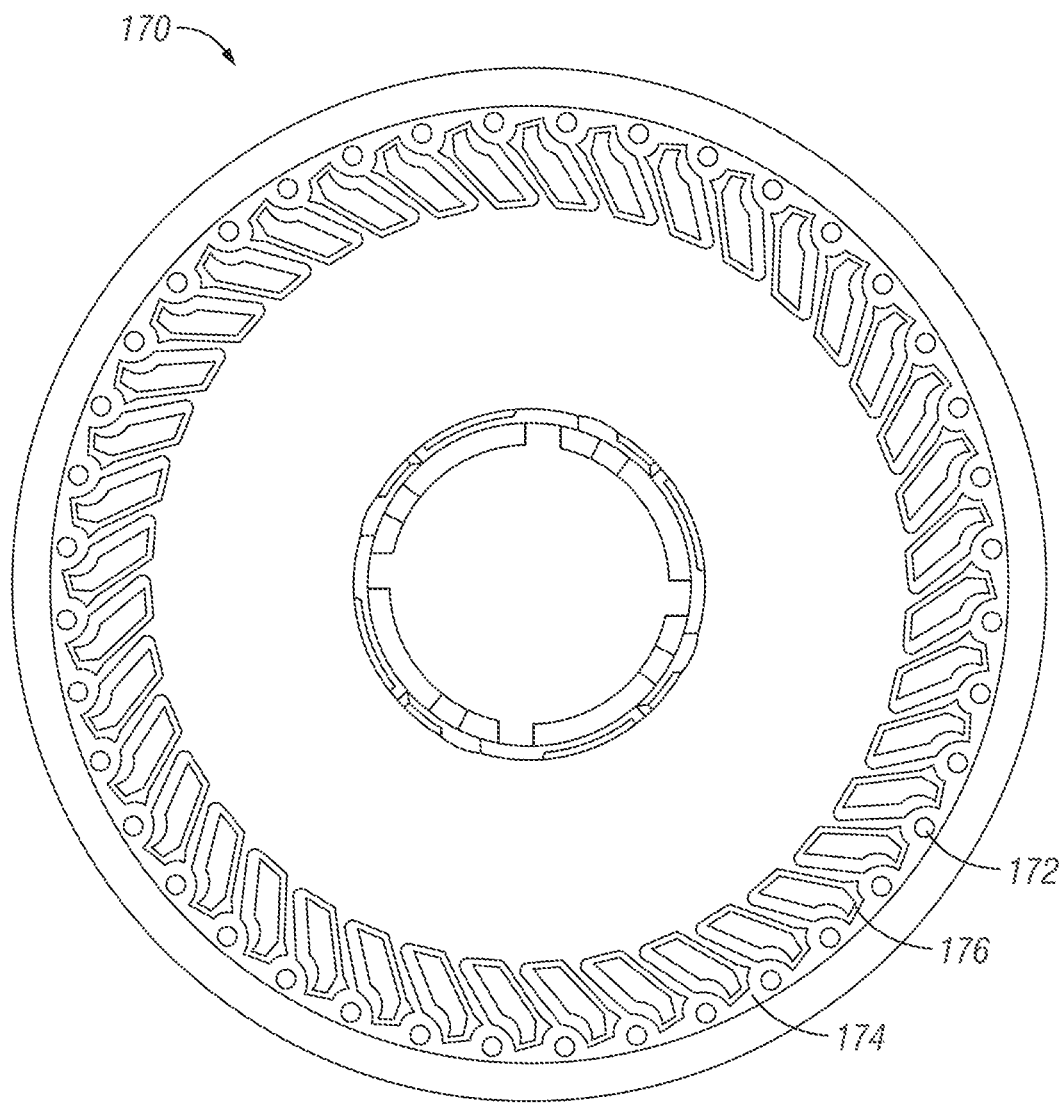
FIG. 17 is a view of a seed disc for use with a seed meter.

In operation, the seed discs of the first and second meters 124, 126 rotate within the housing of the seed meter assembly 120. The discs, such as the disc 170 shown in FIG. 17, include radially spaced seed apertures 172. The seed apertures 172 can varied according to the type of seed, variety of seed, size of seed, coating of the seed, and the like to account for variations in the seed. A plurality of seed apertures 172 form a seed path 174, which is created when the seed disc 170 is rotated. Furthermore, the seed disc 170 may include channels 176, which can be used to aid in agitating a seed pool to direct seed from the seed pool toward the seed apertures 172, in order to aid in providing the seed at the aperture at the point of the pressure differential or positive pressure in order to temporarily adhere the seed at the aperture 172. It should be appreciated that while the seed disc 170 is shown for exemplary purposes, other types of seed disc, including other configurations of seed apertures, seed paths, channels, and the like may be included with any of the embodiments and/or aspects of the invention, and the seed disc itself is not to be limiting to the invention. Instead, it is shown to aid in understanding the invention.

Accordingly, in use with a seed meter 120, the seed disc 170 may rotate such that the seed apertures 172 pass through a first or second seed pool of the meter 60. Adjacent said seed pools the pressure source members 65, 67 will begin providing either a positive or negative force to temporarily adhere a seed at a seed aperture 72. The seed disc 70 continues rotation until a point where there is no pressure differential, such as by an open portion on both sides of the seed meter housing, at which point the seed will be released from said seed aperture. The seed can then be dispensed from the seed meter, such as by a seed chute and/or seed tube, or other conveying means. Such conveying means that can be used with the invention include those disclosed in U.S. Pat. No. 9,756,779, which is hereby incorporated by reference in its entirety. However, it should be appreciated that any type of seed to furry delivery can be used with the invention, including, but not limited to, seed belts, chutes, gravity, brushes, rollers, or any multiples or combinations thereof. The seed is directed towards a furrow or trench created in the ground by the other components of the row unit in order to plant said seed at a desired location and depth, and with the desired spacing between subsequent and past seeds.

From the foregoing, it can be seen that the invention accomplishes at least all of the stated objectives.

What is claimed is:

1. A particulate delivery assembly, comprising:
    a plurality of entrainers operatively connected to one another, each of an entrainer of the plurality of entrainers comprising:
        at least one particulate entrance that leads to a primary flow path;
        a bypass flow path separate from the primary flow path; and
        at least one outlet that combines an end of the primary flow path and an end of the bypass flow path; and
    a plurality of integrated, electric fluid pressure sources positioned inside the particulate delivery assembly, wherein one integrated, electric fluid pressure source of the plurality of integrated, electric fluid pressure sources is positioned inside multiple of the plurality of entrainers;
    wherein the one integrated, electric fluid pressure source provides fluid pressure to the entrainer to move the particulate in the primary flow path and to push the particulate out the at least one outlet with assistance from fluid pressure of the bypass flow path, and towards an end location.

2. The particulate delivery assembly of claim 1, wherein the end location is a row unit of an agricultural implement.

3. The particulate delivery assembly of claim 1, wherein the pressure is negative pressure.

4. The particulate delivery assembly of claim 1, wherein the pressure is positive pressure.

5. The particulate delivery assembly of claim 1 wherein the one integrated, electric fluid pressure source is operatively connected to a flow control for individually adjusting the pressure at each one of the plurality of entrainers.

6. The particulate delivery assembly of claim 5 wherein the flow control is a valve, an insert, or a baffle.

7. The particulate delivery assembly of claim 6 wherein the valve, the insert, or the baffle is positioned downstream at a row unit.

8. The particulate delivery assembly of claim 1 wherein the plurality of entrainers comprises more than three entrainers.

9. The particulate delivery assembly of claim 1 further comprising upper mounting brackets for mounting the plurality of entrainers to bulk seed storage members of an agricultural implement.

10. A particulate delivery assembly, comprising:
    a plurality of entrainers operatively connected to one another, each of said entrainers comprising:
        at least one particulate entrance;
        and at least one outlet; and
        an integrated, electric fluid pressure source positioned to provide fluid pressure to the entrainer to move the particulate out the at least one outlet and towards an end location;
    a plurality of upper mounting brackets for mounting the plurality of entrainers to bulk seed storage members of an agricultural implement; and
    a pivot connection for allowing pivotal movement between the plurality of entrainers and the bulk seed storage members.

* * * * *